US012802654B2

(12) United States Patent
Chien

(10) Patent No.: US 12,802,654 B2
(45) Date of Patent: Nov. 17, 2026

(54) METHOD OF DRIVING SOURCE LINES FOR PROVIDING BRIGHTNESS CONSISTENCY AND DRIVER CIRCUIT UTILIZING THE SAME

(71) Applicant: NOVATEK Microelectronics Corp., Hsin-Chu (TW)

(72) Inventor: Tso-Hua Chien, Hsinchu City (TW)

(73) Assignee: NOVATEK Microelectronics Corp., Hsin-Chu (TW)

( * ) Notice: Subject to any disclaimer, the term of this patent is extended or adjusted under 35 U.S.C. 154(b) by 0 days.

(21) Appl. No.: 19/035,950

(22) Filed: Jan. 24, 2025

(65) Prior Publication Data

US 2025/0322800 A1 Oct. 16, 2025

Related U.S. Application Data

(60) Provisional application No. 63/632,011, filed on Apr. 10, 2024.

(51) Int. Cl.
*G09G 3/3291* (2016.01)
*G09G 3/36* (2006.01)

(52) U.S. Cl.
CPC ......... *G09G 3/3291* (2013.01); *G09G 3/3688* (2013.01); *G09G 2310/08* (2013.01); *G09G 2320/0233* (2013.01); *G09G 2320/0276* (2013.01); *G09G 2330/021* (2013.01); *G09G 2330/028* (2013.01); *G09G 2340/0435* (2013.01)

(58) Field of Classification Search
CPC .......... G09G 3/30; G09G 3/32; G09G 3/3208; G09G 3/3216; G09G 3/3225; G09G 3/3233; G09G 3/3241; G09G 3/325; G09G 3/3258; G09G 3/3266; G09G 3/3275; G09G 3/3283; G09G 3/3291; G09G 3/36; G09G 3/3611; G09G 3/3614; G09G 3/3622; G09G 3/3625; G09G 3/364; G09G 3/3644; G09G 3/3648; G09G 3/3659; G09G 3/3666; G09G 3/3674; G09G 3/3677; G09G 3/3681; G09G 3/3685; G09G 3/3688; G09G 3/3692; G09G 3/3696
USPC ........................................ 345/76–83, 87–104
See application file for complete search history.

(56) References Cited

U.S. PATENT DOCUMENTS 11,705,074 B2 * 7/2023 Bae ...................... G09G 3/3291 345/76
12,658,095 B2 * 6/2026 Chien .................. G09G 3/2092
12,658,140 B2 * 6/2026 Chien .................. G09G 3/3258
(Continued)

FOREIGN PATENT DOCUMENTS

TW 201734563 A 10/2017

*Primary Examiner* — Ke Xiao
*Assistant Examiner* — Nelson Lam
(74) *Attorney, Agent, or Firm* — Winston Hsu

(57) ABSTRACT

A driver circuit includes a gamma voltage generator and a source driver. The driver circuit is used to driving source lines of a display panel including a first area and a second area. The gamma voltage generator updates a set of gamma voltages according to at least a first refresh rate of the first area and a second refresh rate of the second area. The source driver is coupled to the gamma voltage generator to generate a pixel voltage according to pixel data and the set of gamma voltages, and drive a source line according to the pixel voltage.

22 Claims, 8 Drawing Sheets

(56) References Cited

U.S. PATENT DOCUMENTS

| | | | | |
|---|---|---|---|---|
| 2014/0146096 | A1* | 5/2014 | You | G09G 3/006<br>345/89 |
| 2015/0145758 | A1* | 5/2015 | Lee | G09G 3/3648<br>345/87 |
| 2016/0117991 | A1* | 4/2016 | Ha | G09G 3/3233<br>345/78 |
| 2016/0314732 | A1 | 10/2016 | Amundson | |
| 2022/0068202 | A1* | 3/2022 | Kim | G09G 5/14 |
| 2022/0277705 | A1* | 9/2022 | Higuchi | G09G 3/3696 |
| 2024/0046840 | A1* | 2/2024 | Zhao | G09G 3/2018 |
| 2026/0148699 | A1* | 5/2026 | Shin | G09G 3/20 |

* cited by examiner

METHOD OF DRIVING SOURCE LINES FOR PROVIDING BRIGHTNESS CONSISTENCY AND DRIVER CIRCUIT UTILIZING THE SAME

CROSS REFERENCE TO RELATED APPLICATIONS

This application claims the benefit of U.S. Provisional Application No. 63/632,011, filed on Apr. 10, 2024. The content of the application is incorporated herein by reference.

BACKGROUND OF THE INVENTION

1. Field of the Invention

The invention relates to display technology, and specifically, to a method of driving source lines for providing brightness consistency and a driver circuit utilizing the same

2. Description of the Prior Art

Flat-panel displays are widely used in various devices such as televisions, computer monitors, smartphones, and tablets. Flat-panel displays utilize different technologies, including liquid crystal display (LCD), light-emitting diode (LED), and organic light-emitting diode (OLED). Each technology offers unique advantages in terms of brightness, color accuracy, energy efficiency, and viewing angles.

Multi-area frame rate technology on flat panel displays allows different sections of the screen to refresh at varying rates, optimizing performance and visual quality. This approach is particularly beneficial for applications like gaming and video playback, where certain areas of the screen may require higher refresh rates to display fast-moving content smoothly, while other areas can operate at lower rates to save power and reduce heat generation. By dynamically adjusting the frame rate in different zones, flat panel displays can deliver a more efficient and visually appealing experience, minimizing issues such as motion blur and screen tearing. This technology enhances the overall user experience by providing sharper images and smoother transitions in high-demand areas while maintaining energy efficiency.

However, the implementation of multi-area frame rate technology causes a noticeable brightness difference between high-frequency and low-frequency zones, resulting in visual inconsistency and a decline in overall visual quality.

SUMMARY OF THE INVENTION

According to an embodiment of the invention, a display panel includes a first area and a second area, and a method of driving source lines of the display panel includes updating a set of gamma voltages according to at least a first refresh rate of the first area and a second refresh rate of the second area, generating a pixel voltage according to pixel data and the set of gamma voltages, and driving a source line according to the pixel voltage.

According to another embodiment of the invention, a driver circuit includes a gamma voltage generator and a source driver. The driver circuit is used to driving source lines of a display panel including a first area and a second area. The gamma voltage generator updates a set of gamma voltages according to at least a first refresh rate of the first area and a second refresh rate of the second area. The source driver is coupled to the gamma voltage generator to generate a pixel voltage according to pixel data and the set of gamma voltages, and drive a source line according to the pixel voltage.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
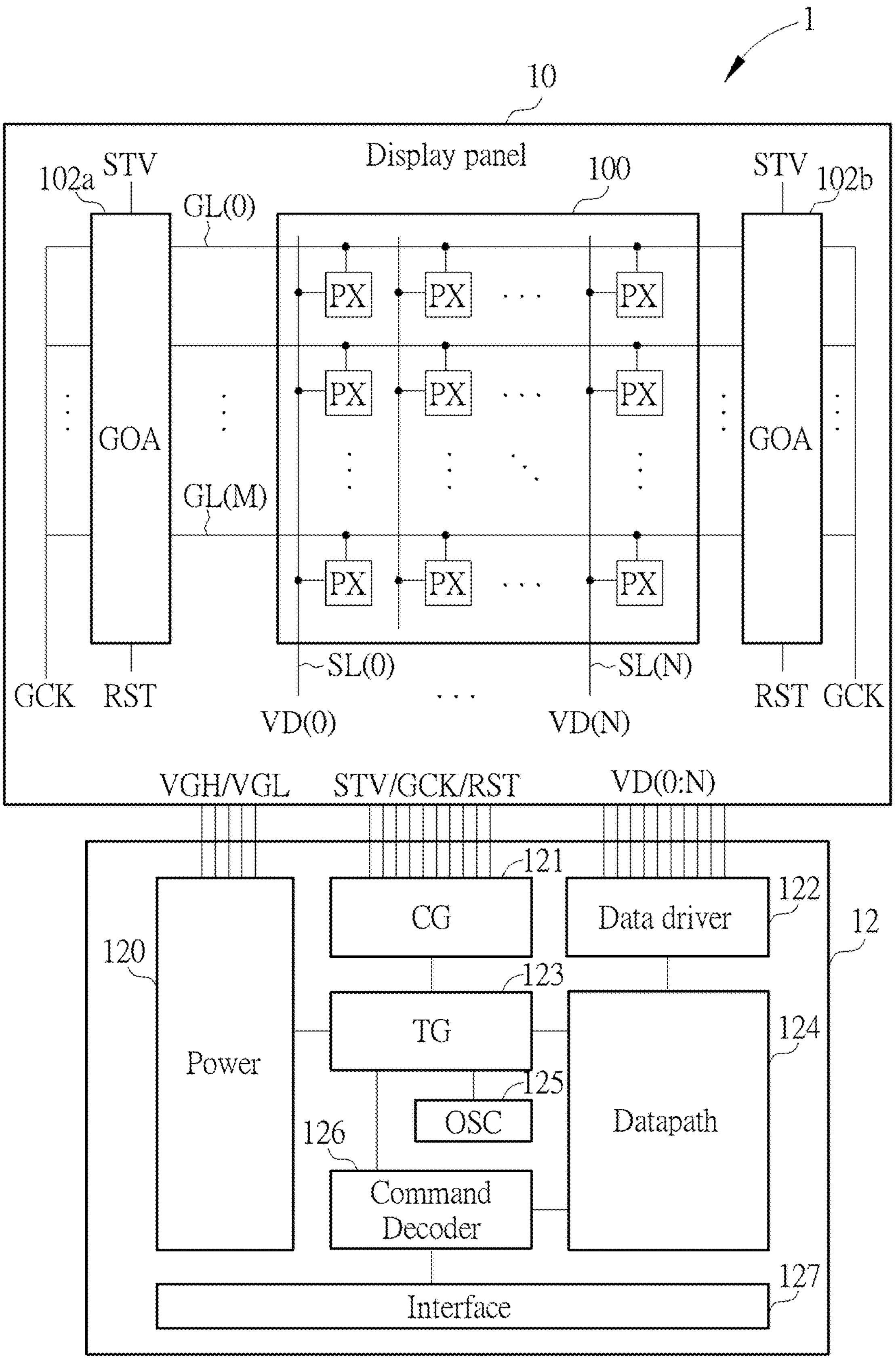
FIG. 1 is a block diagram of a display device according to an embodiment of the invention.

FIG. 1 is a block diagram of a display device 1 according to an embodiment of the invention. The display device 1 may include a display panel 10 and a driver circuit 12 coupled thereto. The driver circuit 12 may receive image data and control data from a host device to display an image on the display panel 10. The display panel 10 may be a liquid crystal display (LCD) panel or an organic light-emitting diode (OLED) panel. The driver circuit 12 may be implemented as an independent integrated circuit.

The display panel 10 may include a pixel array 100, and gate on array (GOA) drivers 102*a* and 102*b*. The GOA drivers 102*a* and 102*b* are coupled to the display panel 100. The pixel array 100 may include pixels PX, source lines SL(0) to SL(N), and gate lines GL(0) to G(M), N, M being positive integers. The pixels PX may be arranged in (N+1) columns and (M+1) rows, and each pixel PX may be a red (R) pixel, a green (G) pixel, or a blue (B) pixel. The (N+1) columns of pixels PX may be coupled to the driver circuit 12 via the source lines SL(0) to SL(N) to receive data voltages VD(0) to VD(N) (referred to as VD(0:N)), thereby displaying images. The (M+1) rows of pixels PX may be coupled to the GOA drivers 102*a* and 102*b* via the gate lines GL(0) to G(M). Each pixel PX may be coupled to a corresponding gate line and source line. The pixel PX may be activated by a gate signal on the corresponding gate line, and may load pixel data represented by a data voltage on the corresponding source line.

Figure 2B:
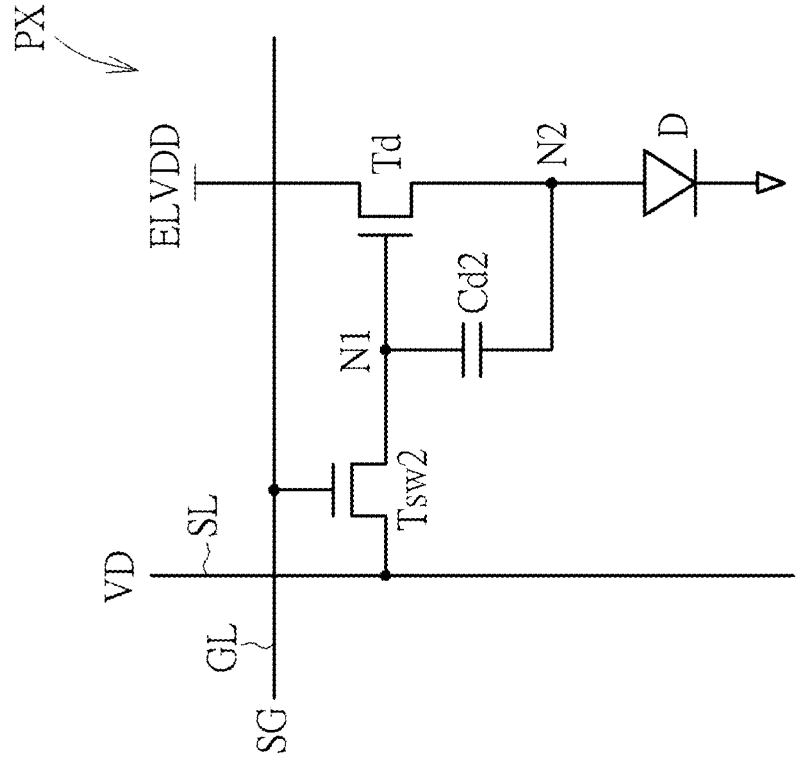
FIG. 2A and FIG. 2B are circuit schematics of the pixel in FIG. 1.
Figure 2A:
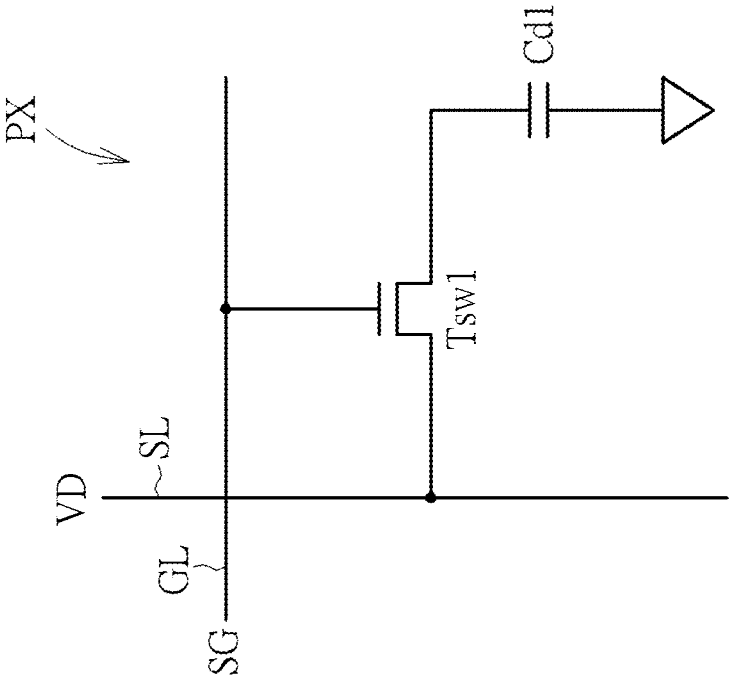

FIGS. 2A and 2B are circuit schematics of the pixel PX in an LCD panel and OLED panel, respectively. In FIG. 2A, the pixel PX in the LCD panel includes a switch transistor Tsw1 and a capacitor Cd1. The switch transistor Tsw1 includes a control terminal coupled to a gate line GL to receive a gate voltage SG, a first terminal coupled to a source line SL to receive a data voltage VD, and a second terminal. The capacitor Cd1 includes a first terminal coupled to the second terminal of the switch transistor Tsw1, and a second terminal coupled to a ground terminal to receive a ground voltage. When the switch transistor Tsw1 is turned on, the capacitor Cd1 may be charged by the data voltage VD. Conversely, when the switch transistor Tsw1 is turned off, the capacitor Cd1 may retain the data voltage VD. However, in practical scenarios, charging the capacitor Cd1 to the desired level of the data voltage VD takes a finite amount of time due to the RC loading effect. Furthermore, the voltage held by the capacitor Cd1 tends to decrease when the switch transistor Tsw1 is turned off, primarily owing to current leakage. The brightness level of the pixel PX is determined by the voltage stored in the capacitor Cd1.

In FIG. 2B, the pixel PX in the OLED panel includes a switch transistor Tsw2, a driving transistor Td, a capacitor Cd2, and a light-emitting diode (LED) D. The switch transistor Tsw2 includes a control terminal coupled to a gate line GL to receive a gate voltage SG, a first terminal coupled to a source line SL to receive a data voltage VD, and a second terminal. The capacitor Cd1 includes a first terminal coupled to the second terminal of the switch transistor Tsw2, and a second terminal. The driving transistor Td includes a control terminal coupled to second terminal of the switch transistor Tsw2, a first terminal coupled to a supply terminal ELVDD, and a second terminal. The LED D includes an anode terminal coupled to the second terminal of the driving transistor Td, and a cathode terminal coupled to a ground terminal to receive a ground voltage. When the switch transistor Tsw2 is turned on, the capacitor Cd2 may be charged by the data voltage VD. Conversely, when the switch transistor Tsw2 is turned off, the capacitor Cd2 may retain the data voltage VD. However, charging the capacitor Cd2 to the desired data voltage VD takes time due to RC loading, and the voltage decreases when the switch transistor Tsw2 is off due to current leakage. The driving transistor Td may generate a driving current according to the voltage stored in the capacitor Cd2, and the driving current is then used to power the LED D, causing the LED D to emit light. The brightness level of the LED D is directly proportional to the driving current, which in turn is determined by the voltage held in the capacitor Cd2.

Figure 3:
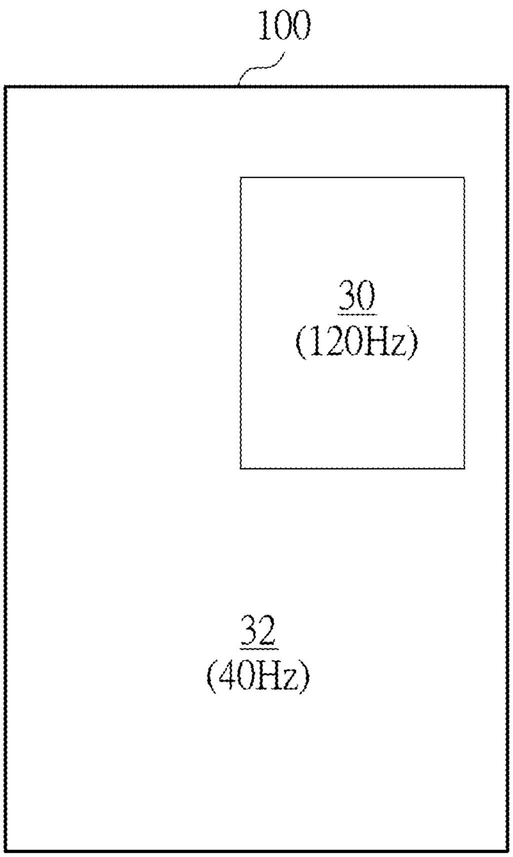
FIG. 3 is a schematic diagram of a multi-area frame rate scheme for use by the display device in FIG. 1.

The display device 1 may utilize a multi-area frame rate (MAFR) scheme, dividing the pixel array 100 into multiple areas updated by different refresh rates. The refresh rate allocations are dynamically adjusted based on the image content. The MAFR scheme may reduce power consumption by lowering the refresh rate in low refresh rate areas, while maintaining high image quality in high refresh areas. FIG. 3 is a schematic diagram of the MAFR scheme for use by the display device 1. The pixel array 100 is divided into a high refresh rate area 30 and a low refresh rate area 32. The high refresh rate area 30 may be updated at a high refresh rate, and the low refresh rate area 32 may be updated at a low refresh rate, where the high refresh rate exceeds the low refresh rate. For example, the high refresh rate area 30 may display dynamic content, such as a video playback or gaming images at 120 Hz, whereas the low refresh rate area 32 may display static content, such as background elements at 40 Hz. The MAFR scheme implements an efficient update ratio between the two areas. For every three frame updates occurring in the high refresh rate area 30, the low refresh rate area 32 is updated just once. Nevertheless, the contrasting refresh rates may lead to different brightness levels between the high refresh rate area 30 and the low refresh rate area 32. In the high refresh rate area 30, the voltage held in the capacitor of each pixel PX approaches a desired voltage during the three consecutive frame updates owing to the RC loading effect, leading to increasing brightness level. In the low refresh rate area 32, the voltage held in the capacitor of each pixel PX declines gradually during the three consecutive frame updates owing to the current leakage effect, leading to decreasing brightness level. The disparity in brightness levels between high refresh rate area 30 and the low refresh rate area 32 might lead to noticeable differences in brightness levels across the pixel array 100. The high refresh rate area 30 may appear brighter than the low refresh rate area 32. These variations in luminance could potentially impact the overall visual consistency and quality of the displayed image, presenting a challenge for delivering uniform brightness across the pixel array 100.

In FIG. 1, the driver circuit 12 may include a power generator 120, a clock generator (CG) 121, a data driver 122, a timing generator (TG) 123, a datapath circuit 124, an oscillator (OSC) 125, a command decoder 126, and an interface circuit 127. The interface circuit 127 may be coupled to the command decoder 126. The command decoder 126 and the oscillator 125 may be coupled to the timing generator 123. The timing generator 123 may be coupled to the power generator 120, the clock generator 121 and the datapath circuit 124. The datapath circuit 124 may be coupled to the data driver 122. The power generator 120, the clock generator 121, and the data driver 122 may be coupled to the display panel 10.

The interface circuit 127 may receive the image data and control data from the host device, and pass the image data and control data to the command decoder 126. The interface circuit 127 may be a mobile industry processor interface (MIPI), serial peripheral interface (SPI), display serial interface (DSI), embedded display port (EDP) interface, low-voltage differential signaling (LVDS) interface, or other display interfaces. The hose device may be a graphics card, smartphone, or embedded system. The image data may include visual content to be displayed on the display panel 100. The control data may be instructions for managing display such as brightness adjustments or pixel updates. The command decoder 126 may interpret the control data to generate specific commands for the display, such as updating pixels, adjusting contrast, or changing display modes. The command decoder 126 may send the commands and the image data to the timing generator 123.

The oscillator 125 may generate system clock signals, and transmit the system clock signal to the timing generator 123. The timing generator 123 may generate a vertical synchronization (Vsync) signal, a horizontal synchronization (Hsync) signal, and other image control signals according to the system clock signal, the image data, and the commands, and forward the Vsync signal, Hsync signal and other image control signals to the power generator 120, the clock generator 121, the datapath circuit 124, and the display panel 10. The power generator 120 may generate supply voltages VGH and VGL, and provide the supply voltages VGH and VGL to the display panel 10 for display operations. For example, the supply voltages VGH and VGL may be set at specific voltage levels, such as VGH=8V and VGL=−8V. The clock generator 121 may generate and supply a start vertical (STV) signal, clock signal GCK, and reset signal RST to the display panel 10. The STV signal signifies the beginning of pixel data in a frame, facilitating display synchronization. The clock signal GCK may be used to selectively sample the pixel data, thereby reducing power consumption. The reset signal RST may be used to reset the GOA drivers 102*a* and 102*b*.

The datapath circuit 124 may process the image data to generate pixel data. The pixel data is then fed into the data driver 122 to generate the data voltages VD(0) to VD(N).

Figure 4:
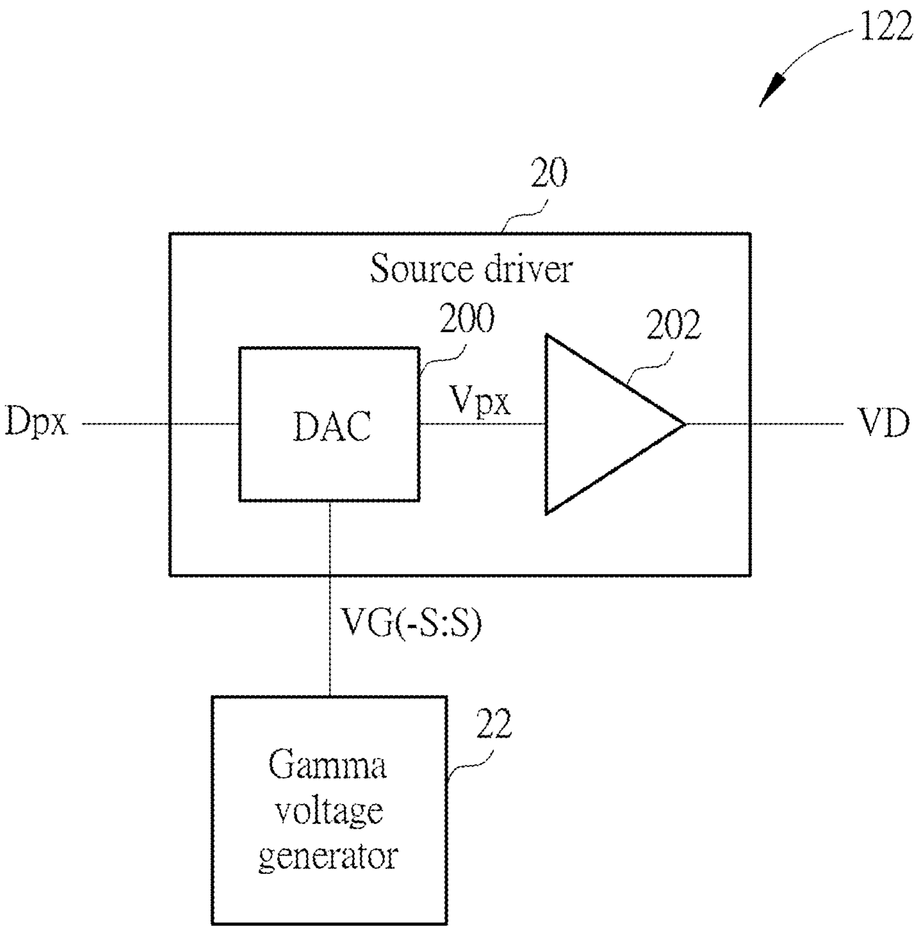
FIG. 4 is a block diagram of the data driver in FIG. 1.

FIG. 4 is a block diagram of the data driver 122 for a single channel. The data driver 122 may convert pixel data Dpx into a data voltage VD.

The data driver 122 may include a source driver 20 and a gamma voltage generator 22 coupled thereto. The source driver 20 may include a digital-to-analog converter (DAC) 200 and an output buffer 202, allowing for precise control over the brightness of each pixel PX.

The pixel data Dpx may represent a gray level ranging from 0 to 255, providing 256 possible levels. The data voltage VD may vary between a reference voltage VCOM and either a positive supply voltage GVDDP or a negative supply voltage GVDDN. In one example, the reference voltage VCOM may be set to 0V, the positive supply voltage GVDDP may be set to 5V, and the negative supply voltage GVDDN may be set to −5V. The negative supply voltage GVDDN and the positive supply voltage GVDDP may be adaptable.

The gamma voltage generator 22 may generate a set of gamma voltages VG(−S:S), where S is a positive integer. For example, if S=255, the gamma voltage generator 22 may generate 511 gamma voltages. The set of gamma voltages VG(−S:S) spans from the negative supply voltage GVDDN to the positive supply voltage GVDDP, with the reference voltage VCOM at the midpoint The DAC 200 may receive the pixel data Dpx from the datapath circuit 124 and the set of gamma voltages VG(−S:S) from the gamma voltage generator 22. The DAC 200 may select an appropriate gamma voltage from the set of gamma voltages VG(−S:S) according to the pixel data Dpx, effectively converting the digital pixel information into an analog pixel voltage Vpx.

The output buffer 202 is coupled to the DAC 200. The output buffer 202 may maintain signal integrity and/or amplify power of the pixel voltage Vpx to generate a data voltage VD, and drive the data voltage VD to the display panel 10 via a source line SL (n), where n is an integer between 0 and N.

While FIG. 4 illustrates the data driver 122 for a single channel for ease of explanation, those skilled in the art would recognize that the data driver 122 may be adapted for multiple channels based on similar principles.

Figure 5:
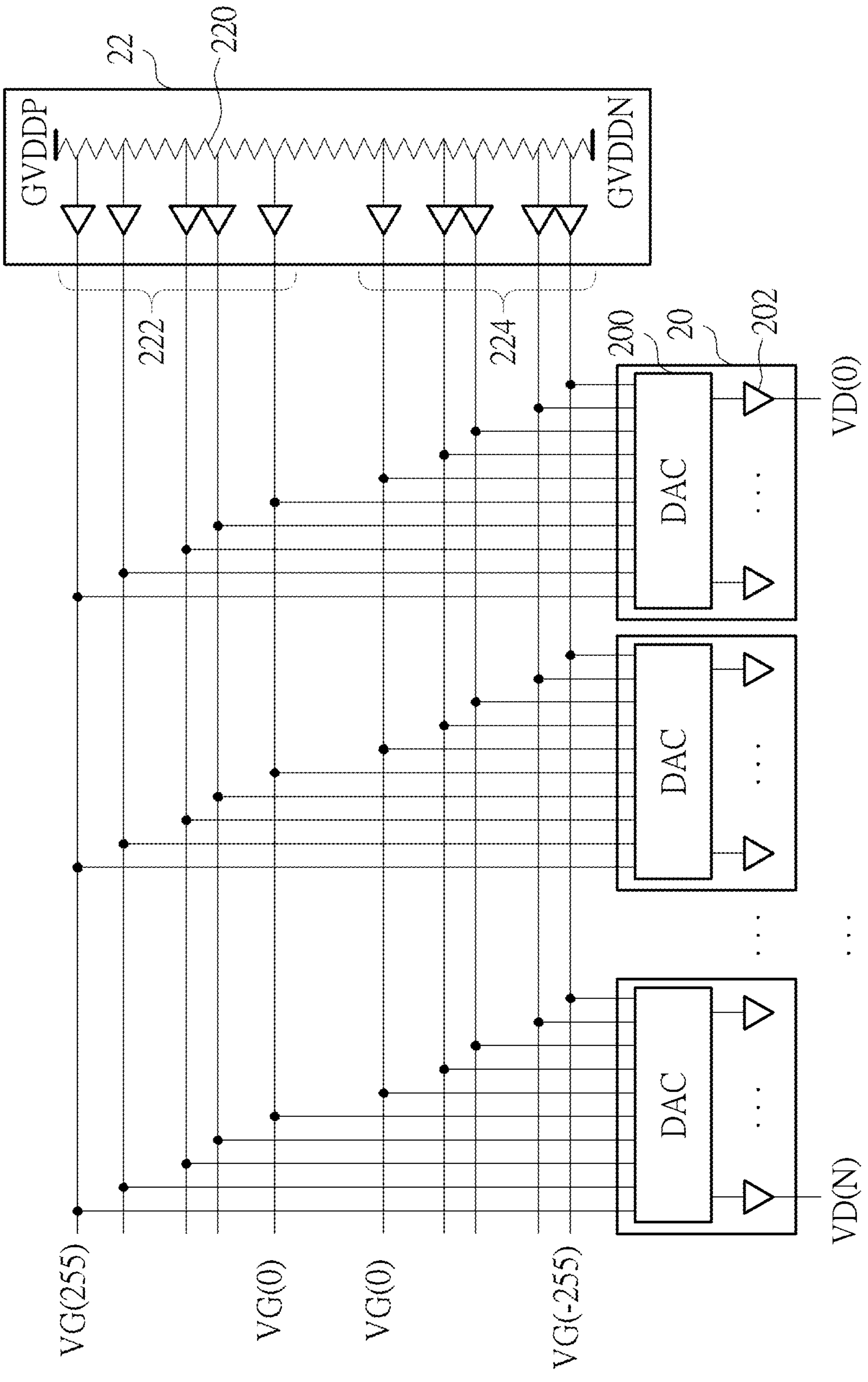
FIG. 5 is a circuit schematic of the data driver in FIG. 1.

FIG. 5 is a circuit schematic of the data driver 122. The gamma voltage generator 22 may include a resistor string 220 a set of positive gamma voltage buffers 222 and a second set of negative gamma voltage buffers 224. The resistor string 220 may be coupled between a high reference terminal and a low reference terminal. The high reference terminal may provide the positive supply voltage GVDDP, and the low reference terminal may provide the negative supply voltage GVDDN. The resistor string 220 may generate a set of raw voltages gradient from the positive supply voltage GVDDP to the negative supply voltage GVDDN.

Figure 6:
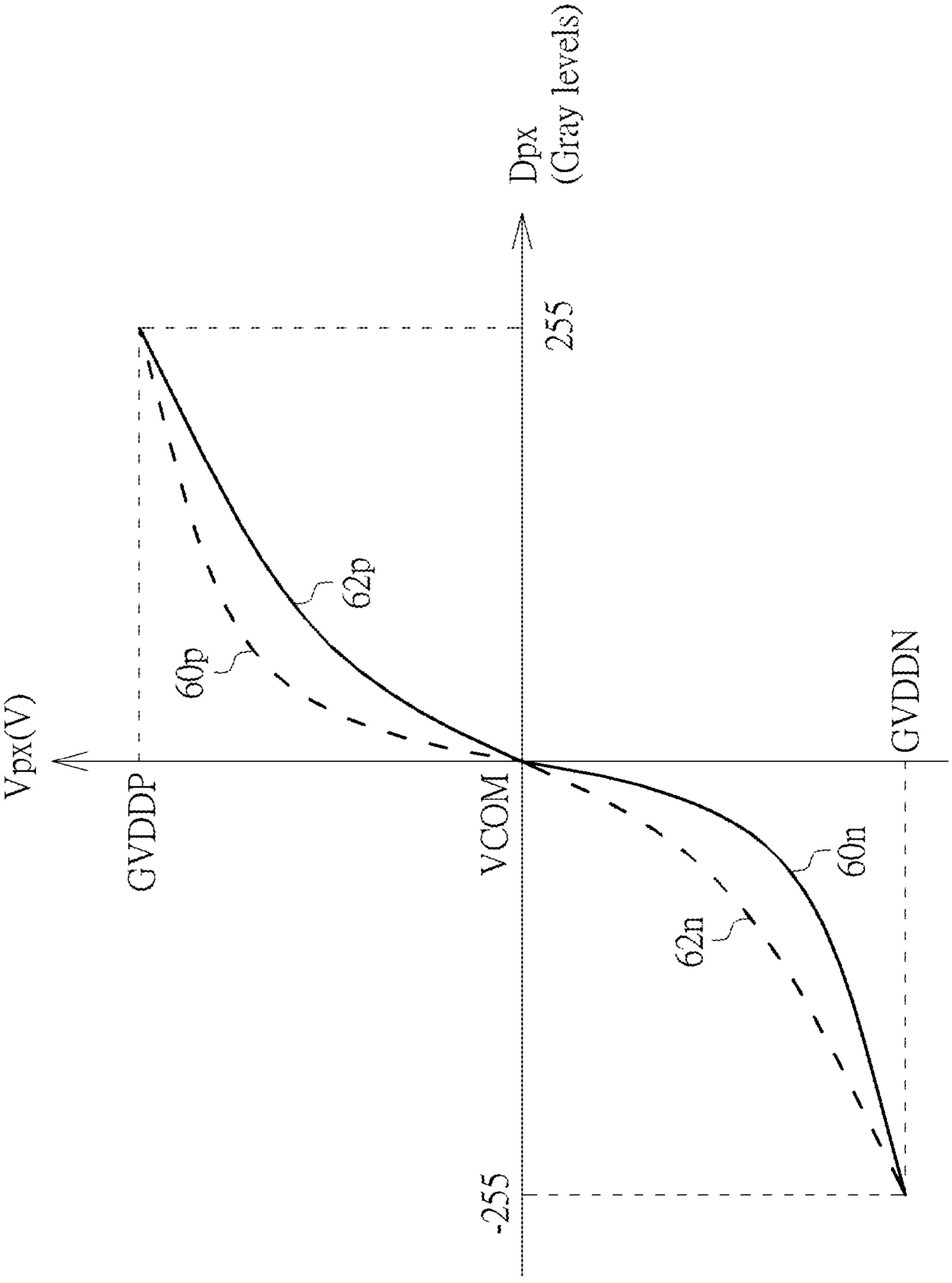
FIG. 6 is a schematic diagram of pixel data and pixel voltage conversion.

In some embodiments, the set of positive gamma voltage buffers 222 may tap into appropriate positions on the upper half of the resistor string 220 to generate a set of positive reference gamma voltages, and the gamma voltage generator 22 may then select a set of gamma voltages VG(S:0) from the set of positive reference gamma voltages according to a gamma table that follows a desired gamma curve. The number of the positive reference gamma voltages may exceed the number of the gamma voltages VG(S:0). For example, the set of positive gamma voltage buffers 222 may tap evenly along the upper half of the resistor string 220 to generate 1001 positive reference gamma voltages from the positive supply voltage GVDDP at 5V to the reference voltage VCOM at 0V, with a 5 mV (=5/1000) resolution. In some embodiments, other number of positive reference gamma voltages may be generated to acquire the desired resolution. For example, the set of positive gamma voltage buffers 222 may generate 1024 or 2048 positive reference gamma voltages to meet the design requirement. Each step down the resistor string 220 decreases the voltage by 5 mV, providing a fine granularity of voltage levels for precise gamma correction. The gamma table, which may be stored in a local memory, may pair gray levels with positive reference gamma voltages conforming to the desired gamma curve, e.g., the gamma curve 62*p* in FIG. 6. FIG. 6 is a schematic diagram of pixel data and pixel voltage conversion, where the horizontal axis represents the pixel data Dpx in gray level, and the vertical axis represents the pixel voltage Vpx in voltage. The conversion may be performed according to one of the gamma curves 60*p*, 62*p*, 60*n*, and 62*n*. The non-linear gamma curves 60*p*, 62*p*, 60*n*, and 62*n* may be selected based on the pixel array 100 to compensate for the non-linear luminance response thereof, ensuring accurate grayscale reproduction and color fidelity across the entire brightness range. The gamma voltage generator 22 may select the set of gamma voltages VG(255:0) from the 1001 positive reference gamma voltages according to the gamma table, delivering a set of gamma voltages VG(255:0) that closely follow the gamma curve 62*p*. The generation of gamma voltages VG(255:0) can be accomplished through various approaches, with the above method representing just one possible implementation. Specifically, digital and analog gamma techniques are available for generating the gamma voltage VG(255:0). The digital approach relies on a lookup table that maps the desired gamma curve in digital form, while the analog method employs specialized circuitry to produce the gamma curve. To enhance precision in both approaches, dithering techniques can be applied, allowing for finer control over the voltage transitions and resulting in smoother gradients.

Likewise, the set of negative gamma voltage buffers 224 may tap into appropriate positions on the lower half of the resistor string 220 to generate a set of negative reference gamma voltages, and then the gamma voltage generator 22 may select a set of gamma voltages VG(0:−S) from the set of negative reference gamma voltages according to a gamma table conforming to another desired gamma curve. For example, the set of negative gamma voltage buffers 224 may tap evenly along the lower half of the resistor string 220 to generate 1001 negative reference gamma voltages (referred to as a set of reference gamma voltages) from the reference voltage VCOM at 0V to the negative supply voltage GVDDN at −5V, with a 5 mV (=5/1000) resolution. Each step down the resistor string 220 decreases the voltage by 5 mV, providing a fine granularity of voltage levels for precise gamma correction. The gamma table, which may be stored in the local memory, may pair gray levels with negative reference gamma voltages conforming to the other desired gamma curve, e.g., the gamma curve 62*n* in FIG. 6. The gamma voltage generator 22 may select the set of gamma voltages VG(0:−255) from the 1001 negative reference gamma voltages according to the gamma table, delivering a set of gamma voltages VG(0:−255) that closely follow the gamma curve 62*n*.

The gamma voltage generator 22 may generate the set of gamma voltages VG(255:−255), and the multi-channel source drivers 20 may obtain the set of gamma voltages VG(255:−255), the DACs may convert (N+1) pixel data into (N+1) pixel voltages, and the output buffers 202 may drive the data voltages VD(0:N) to the pixel array 100 via the source lines SL(0) to SL(N).

Accordingly, the set of gamma voltages VG(255:−255) may be adjusted by modifying the positive supply voltage GVDDP/negative supply voltage GVDDN, and/or adopting a different gamma curve. For example, if the positive supply voltage GVDDP is reduced from 5V to 4.9V, the resolution of the positive reference gamma voltages will be reduced from 5 mV to 4.9 mV. If the negative supply voltage GVDDN is raised from −5V to −4.9V, the resolution of the negative reference gamma voltages will be reduced from 5 mV to 4.9 mV. Alternatively, the gamma voltage generator 22 may select the gamma voltages VG(255:0) based on a different gamma curve, such as gamma curve 60*p* in FIG. 6. This flexibility in adjusting the positive supply voltage GVDDP/negative supply voltage GVDDN and selecting different gamma curves enables the system to achieve uniform brightness across the pixel array 100 for the MAFR scheme.

Figure 7:
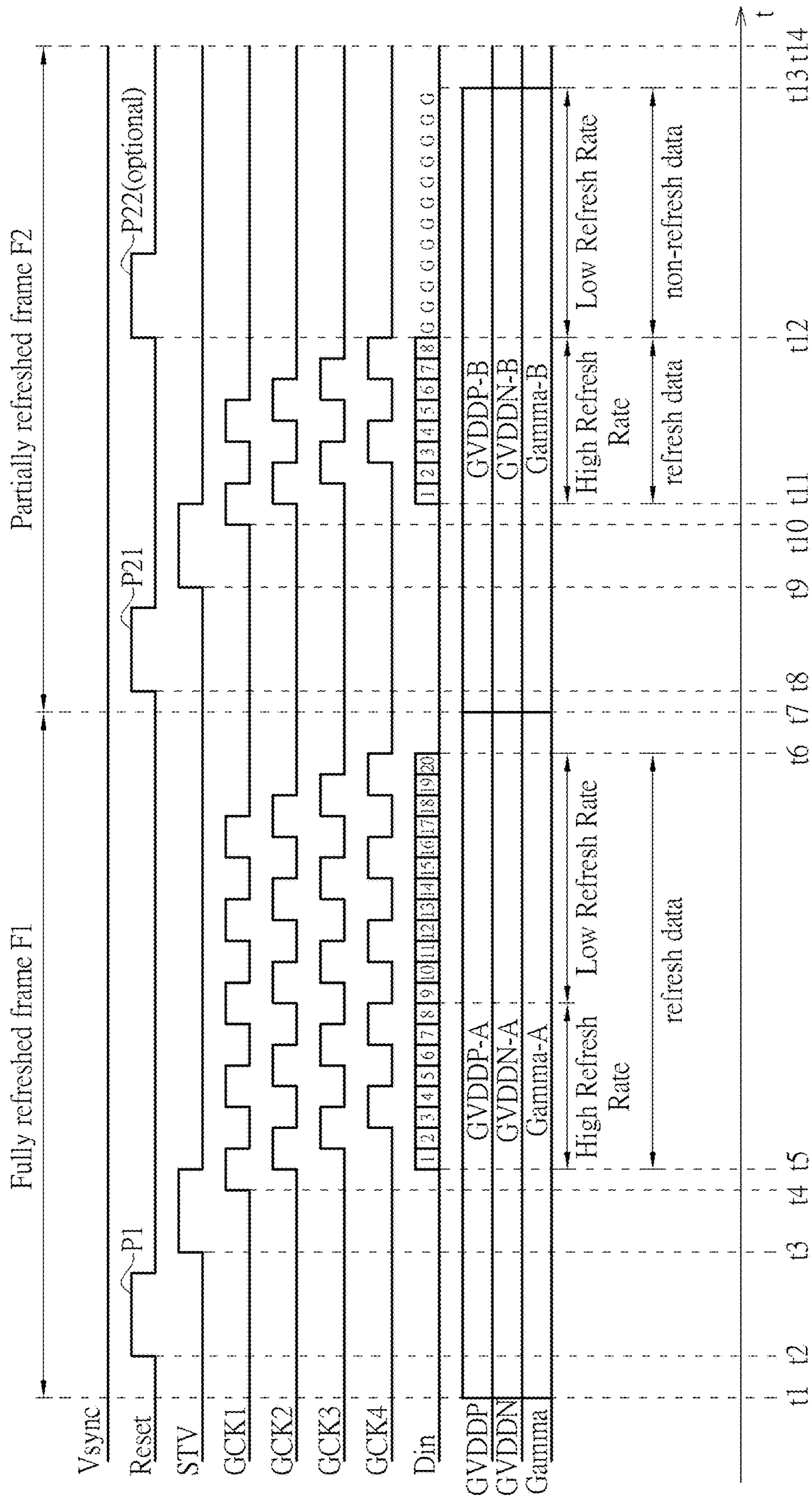
FIG. 7 is a timing diagram of a multi-area frame rate scheme according to an embodiment of the invention.

FIG. 7 is a timing diagram of the MAFR scheme according to an embodiment of the invention. The pixel array 100 may be updated by alternating frames F1 and F2. The frame F1 is a fully refreshed frame where all pixels PX including those in both high and low refresh rate areas are updated, while the frame F2 is a partially refreshed frame where only pixels PX in the high refresh rate area are updated, but not pixels PX the low refresh rate area. By adjusting the positive supply voltage GVDDP/negative supply voltage GVDDN and/or adopting gamma tables Gamma differently for fully refreshed frames and partially refreshed frames, the brightness of the high refresh rate area may be tuned to closely match that of the low refresh rate area in the partially refreshed frame F2, ensuring a consistent brightness performance across both high and low refresh rate areas.

At Time t1, a pulse in the Vsync signal marks the start of the frame F1. The positive supply voltage GVDDP is set to a positive supply voltage GVDDP-A, the negative supply voltage GVDDN is set to a negative supply voltage GVDDN-A, and the gamma table Gamma is set to a gamma table Gamma-A. In an example, the positive supply voltage GVDDP-A is 5V, the negative supply voltage GVDDN is −5V, and the gamma table Gamma-A corresponds to the curves 60*p* and 60*n*.

At Time t2, a pulse P1 in the reset signal clears each pixel PX. At Time t3, a pulse in the STV signal indicates the beginning of incoming pixel data in the frame F1. The clock signals GCK1 to GCK4 are derived from the CGK clock signal, each shifted sequentially by 90 degrees. At Time t4, the data voltage on a source line is sampled by the rising edge of a pulse in the clock signal GCK1, generating Data 1 in the data signal Din at Time t5. Between Time t4 and t6, the data voltage on the source line is sequentially sampled by the clock signals GCK1 to GCK4, generating Data 1 to Data 20 in the data signal Din. The data 1 to data 20 may be driven to pixels PX on the 1st to the 20th gate lines, respectively, refreshing all pixels PX on the source line. In the embodiment, the data 1 to data 8 may be driven to pixels PX in the high refresh rate area, while the data 9 to data 20 may be driven to the pixels PX in the low refresh rate area.

At Time t7, a pulse in the Vsync signal marks the start of the frame F2. The positive supply voltage GVDDP is set to a positive supply voltage GVDDP-B, the negative supply voltage GVDDN is set to a negative supply voltage GVDDN-B, and the gamma table Gamma is set to a gamma table Gamma-B. In an example, the positive supply voltage GVDDP-B is 4.9V, the negative supply voltage GVDDN is −4.9V, and the gamma table Gamma-B corresponds to the curves 62*p* and 62*n*.

At Time t8, a pulse P21 in the reset signal clears each pixel PX. At Time t9, a pulse in the STV signal indicates the beginning of incoming pixel data in the frame F2. At Time t10, the data voltage on the source line is sampled by the rising edge of a pulse in the clock signal GCK1, generating Data 1 in the data signal Din at Time t11. Between Time t10 and Time t12, the data voltage on the source line is sequentially sampled by the clock signals GCK1 to GCK4, generating data 1 to data 8 in the data signal Din, thereby updating data to the pixels PX in the high refresh rate area. At Time t12, a pulse P22 in the reset signal resets the GOA drivers 102*a* and 102*b*, and the clock signals GCK1 to GCK4 are deactivated to suppress clock pulses, preventing further data sampling for the low refresh rate area. In some embodiments, the pulse P22 may be eliminated. Between Time t12 and Time t13, the data voltage on the source line is not sampled, setting the data signal Din to a ground voltage (e.g., 0V) in the low refresh rate area. Accordingly, the high refresh rate area and the low refresh rate area may be defined by the clock signals GCK1 to GCK4. The clock signals GCK1 to GCK4 are activated in the high refresh rate area, and deactivated in the low refresh rate area. In some embodiments, the clock generator 121, the datapath circuit 124, and the data driver 122 may be suspended between Time t12 and Time t13, thereby reducing energy consumption, ensuring that the display device 1 is not using unnecessary energy when no data is being processed.

Figure 8:
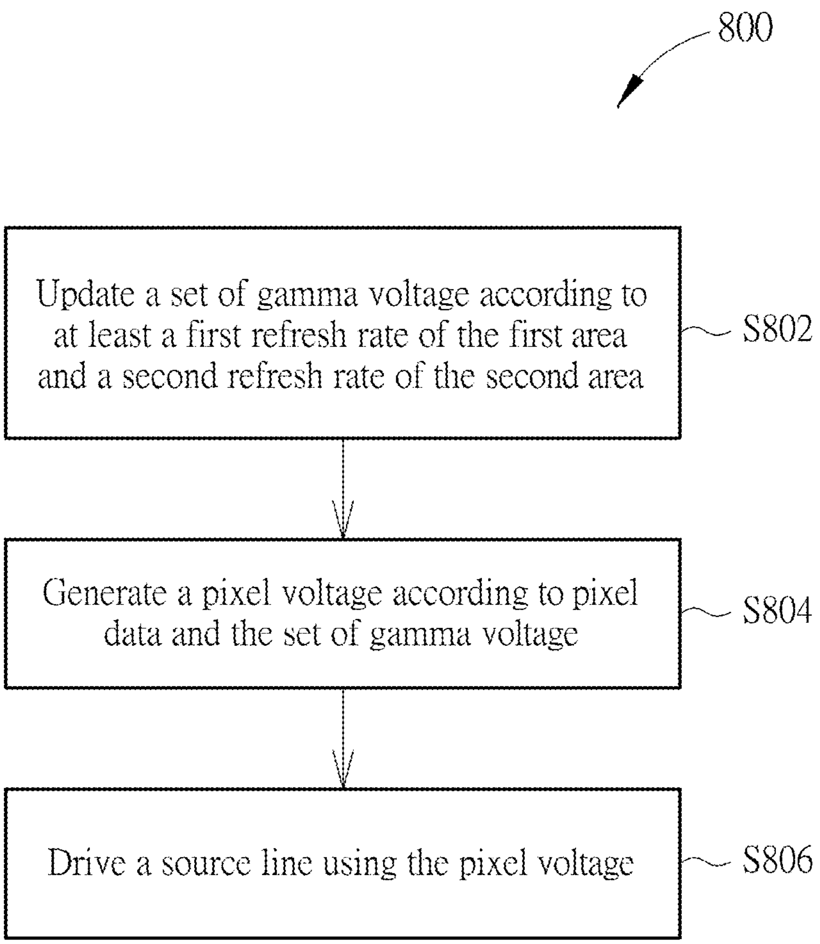
FIG. 8 is a flowchart of a method of driving the source lines of the display panel in FIG. 1.

FIG. 8 is a flowchart of a method 800 of driving the source lines of the display panel 100 having multiple areas operating at different refresh rates. The method 800 includes Steps S802 to S806, dynamically updating a set of gamma voltages for a partially refreshed frame based on the different refresh rates, thereby delivering uniform brightness across the pixel array 100. Any reasonable step change or adjustment is within the scope of the present disclosure. Steps S802 to S806 are detailed as follows:

Step S802: The gamma voltage generator 22 updates a set of gamma voltages according to at least a first refresh rate of the first area and a second refresh rate of the second area;

Step S804: The source driver 20 generates a pixel voltage Vpx according to pixel data Dpx and the set of gamma voltages;

Step S806: The source driver 20 drives a source line according to the pixel voltage Vpx.

In Step S802, the first area and the second area are located on the display panel 100, where the first area may be the high refresh rate area, and the second area may be the low refresh rate area. The driver circuit 12 may determine a ratio of the fully refreshed frames to the partially refreshed frames according to the first refresh rate f1 of the first area and the second refresh rate f2 of the second area. In some embodiments, the ratio of the fully refreshed frames to the partially refreshed frames may be f2:(f1-f2). For example, if the first refresh rate f1 is 120 Hz, and the second refresh rate f2 is 60 Hz, the pixel array 100 may be updated by alternating between fully refreshed frames and partially refreshed frames, resulting in a 1:1 ratio (60:(120-60)). The gamma voltage generator 22 may then generate one set of gamma voltages VG1(S:−S) for the fully refreshed frames, and another set of gamma voltages VG2(S:−S) for the partially refreshed frames. In another example, if the first refresh rate f1 is 120 Hz, and the second refresh rate f2 is 40 Hz, the pixel array 100 may be updated by 1 fully refreshed frame followed by 2 partially refreshed frames, resulting in a 1:2 ratio (40:(120-40)), The gamma voltage generator 22 may then generate one set of gamma voltages VG1(S:−S) for the fully refreshed frames, and another set of gamma voltages VG2(S:−S) for the partially refreshed frames. In other embodiments, the gamma voltage generator 22 may generate separate sets of gamma voltages VG1(S:−S), VG2(S:−S) and VG3(S:−S) for the fully refreshed frames, the first partially refreshed frames, and the second partially refreshed frames. For the fully refreshed frames, the set of gamma voltages VG1(S:−S) may be generated according to a default positive supply voltage GVDDP, a default negative supply voltage GVDDN and a default gamma table Gamma. For the partially refreshed frames, the set of gamma voltages VG2(S:−S)/VG3(S:−S) may be generated according to a modified positive supply voltage GVDDP, a modified negative supply voltage GVDDN, and/or another gamma table Gamma.

In Step S804, the DAC 200 selects one from the newly adjusted set of gamma voltages according to pixel data Dpx to generate a pixel voltage Vpx. In Step S806, the output buffer 202 maintains or amplifies the power of the pixel voltage Vpx to generate the data voltage VD, and applies the data voltage VD to the pixel array 100 via a source line.

For a LCD display panel 10, the gamma voltage generator 22 may determine a frame update type according to the first refresh rate and the second refresh rate, and update the set of gamma voltages VG(S:−S) according to a polarity parameter and the frame update type. The frame update type may be either fully refreshed or partially refreshed. The polarity parameter indicates the polarity of the data voltages VD applied to the pixels PX in a frame. A polarity inversion technique may be used in the LCD display panel 10, in which the data voltage VD applied to each pixel PX alternates between positive and negative to prevent damage and reduce visual artifacts. Further, the set of gamma voltages VG(S:−S) may be updated on the basis of frames. Table 1 illustrates the configuration of the display device 1 according to an embodiment of the invention. The set of gamma voltages VG(S:−S) are updated per frame. The polarity parameter may be inverted in a fully refreshed frame, where both the first area and the second area are refreshed in a frame. In Table 1, the "+" and "−" symbols represent the positive polarity and negative polarity, respectively.

TABLE 1

| | F1 (FR) | F2 (PR) | F3 (FR) | F4 (PR) |
|---|---|---|---|---|
| GVDDP | GVDDP-A | GVDDP-B | GVDDP-A | GVDDP-B |
| GVDDN | GVDDN-A | GVDDN-B | GVDDN-A | GVDDN-B |
| Gamma | Gamma-A | Gamma-B | Gamma-C | Gamma-D |
| GL(0) | + | + | − | − |
| GL(1) | + | + | − | − |
| GL(2) | + | + | − | − |
| GL(3) | + | + | − | − |
| GL(4) | + | + | − | − |
| GL(5) | + | + | − | − |
| GL(6) | + | + | − | − |
| GL(7) | + | + | − | − |
| GL(8) | + | + | − | − |
| GL(9) | + | + | − | − |
| GL(10) | + | + | − | − |
| GL(11) | + | + | − | − |
| GL(12) | + | + | − | − |
| GL(13) | + | + | − | − |
| GL(14) | + | + | − | − |
| GL(15) | + | + | − | − |
| GL(16) | + | + | − | − |
| GL(17) | + | + | − | − |
| GL(18) | + | + | − | − |
| GL(19) | + | + | − | − |

The pixel array 100 includes gate lines GL(0) to GL(19), where the gate lines GL(0) to GL(7) are located in the high refreshed rate area, and the gate lines GL(8) to GL(19) are located in the low refreshed rate area. The pixel array 100 sequentially receive a fully refreshed (FR) frame F1, partially refreshed (PR) frame F2, fully refreshed frame F3, and partially refreshed frame F4. The polarity inversion occurs during the fully refreshed frame F3.

In the fully refreshed frame F1, the polarity of the data voltages VD applied to the pixels PX is positive, the gamma voltage generator 22 uses a supply voltage GVDDP-A, and/or the gamma table Gamma-A to generate a set of gamma voltages VG11(S:−S). The supply voltage GVDDP-A may be 5V, and the gamma table Gamma-A may correspond to the curve 60*p*. The source driver 20 then generates 20 pixels voltages Vpx using the set of gamma voltages VG11(S:−S), and sequentially drive a source line to update data voltages VD for the pixels PX on the gate lines GL(0) to GL(19) according to the 20 pixels voltages Vpx.

In the partial refreshed frame F2, the polarity of the data voltages VD applied to the pixels PX is positive, the gamma voltage generator 22 uses a supply voltage GVDDP-B, and/or the gamma table Gamma-B to generate a set of gamma voltages VG12(S:−S). The supply voltage GVDDP-A may be 4.9V, and the gamma table Gamma-A may correspond to the curve 62*p*. The source driver 20 then generates 8 pixels voltages Vpx using the set of gamma voltages VG12(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F2, halting updates for the pixels PX on the gate lines GL(8) to GL(19).

In the fully refreshed frame F3, the polarity of the data voltages VD applied to the pixels PX is negative, the gamma voltage generator 22 uses a supply voltage GVDDN-A, and/or the gamma table Gamma-C to generate a set of gamma voltages VG13(S:−S). The supply voltage GVDDP-B may be −5V, and the gamma table Gamma-A may correspond to the curve 60*n*. The source driver 20 then generates 20 pixels voltages Vpx using the set of gamma voltages VG13(S:−S), and sequentially drive a source line to update data voltages VD for the pixels PX on the gate lines GL(0) to GL(19) according to the 20 pixels voltages Vpx.

In the partial refreshed frame F4, the polarity of the data voltages VD applied to the pixels PX is negative, the gamma voltage generator 22 uses a supply voltage GVDDN-B, and/or the gamma table Gamma-D to generate a set of gamma voltages VG14(S:−S). The supply voltage GVDDP-B may be −4.9V, and the gamma table Gamma-A may correspond to the curve 62*n*. The source driver 20 then generates 8 pixels voltages Vpx using the set of gamma voltages VG14(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F4, halting updates for the pixels PX on the gate lines GL(8) to GL(19).

In some embodiments, the gamma voltage generator 22 may update the set of gamma voltages VG(S:−S) by modifying the positive supply voltage GVDDP/negative supply voltage GVDDN. The gamma voltage generator 22 may determine the positive supply voltage GVDDP/negative supply voltage GVDDN according to the polarity parameter and the frame update type, and update the set of gamma voltages according to the positive supply voltage GVDDP/negative supply voltage GVDDN. In the frame F1, the polarity parameter indicates the positive polarity and the frame update type is fully refreshed. Therefore, the gamma voltage generator 22 may generate the set of gamma voltages according to the positive supply voltage GVDDP-A. In the frame F2, the polarity parameter indicates the positive polarity and the frame update type is partially refreshed. Therefore, the gamma voltage generator 22 may generate the set of gamma voltages according to the positive supply voltage GVDDP-B different from the positive supply voltage GVDDP-A. In the frame F3, the polarity parameter indicates the negative polarity and the frame update type is fully refreshed. Therefore, the gamma voltage generator 22 may generate the set of gamma voltages according to the negative supply voltage GVDDN-A. In the frame F4, the polarity parameter indicates the negative polarity and the frame update type is partially refreshed. Therefore, the gamma voltage generator 22 may generate the set of gamma voltages according to the negative supply voltage GVDDN-B different from the negative supply voltage GVDDN-A. The selection of the supply voltages GVDDP-A, GVDDP-B, GVDDN-A and GVDDN-B may depend on the electrical characteristics of the pixel array 100 such as RC loading and current leakage. The positive supply voltage GVDDP-B chosen for a large RC time constant/high current leakage may be lower compared to the voltage chosen for a small RC time constant/low current leakage, compensating for the slow charging response/fast current drop of each pixel PX. Likewise, the positive supply voltage GVDDN-B chosen for a large RC time constant/high current leakage may be higher compared to the voltage chosen for a small RC time constant/low current leakage. A numeric example is shown in Table 2.

Table 2 illustrates a configuration of the display device 1 according to another embodiment of the invention. Table 2 adopts the supply voltage modification to update the set of gamma voltages VG(S:−S) frame by frame. The refreshed data may have a gray level "255", and the unrefreshed data may have a gray level "0". The polarity inversion occurs during a fully refreshed frame. Each cell contains the polarity parameter, the voltage in the capacitor of a pixel PX, and the luminance of the pixel PX, where the "+" and "−" symbols represent the positive polarity and negative polarity, respectively,

TABLE 2

| | F1 (FR) | F2 (PR) | F3 (FR) | F4 (PR) |
|---|---|---|---|---|
| GVDDP/GVDDN | +5 V | +4.9 V | −5 V | −4.9 V |
| GL(0) | +/ +4.9 V/ 300 nits | +/ +4.9 V/ 300 nits | −/ −4.9 V/ 300 nits | −/ −4.9 V/ 300 nits |
| GL(1) | +/ +4.9 V/ 300 nits | +/ +4.9 V/ 300 nits | −/ −4.9 V/ 300 nits | −/ −4.9 V/ 300 nits |
| GL(2) | +/ +4.9 V/ 300 nits | +/ +4.9 V/ 300 nits | −/ −4.9 V/ 300 nits | −/ −4.9 V/ 300 nits |
| GL(3) | +/ +4.9 V/ 300 nits | +/ +4.9 V/ 300 nits | −/ −4.9 V/ 300 nits | −/ −4.9 V/ 300 nits |
| GL(4) | +/ +4.9 V/ 300 nits | +/ +4.9 V/ 300 nits | −/ −4.9 V/ 300 nits | −/ −4.9 V/ 300 nits |
| GL(5) | +/ +4.9 V/ 300 nits | +/ +4.9 V/ 300 nits | −/ −4.9 V/ 300 nits | −/ −4.9 V/ 300 nits |

The pixel array 100 includes gate lines GL(0) to GL(5), where the gate lines GL(0) to GL(2) are located in the high refreshed rate area, and the gate lines GL(3) to GL(5) are located in the low refreshed rate area. The pixel array 100 sequentially receive a fully refreshed frame F1, partially refreshed frame F2, fully refreshed frame F3, and partially refreshed frame F4. The polarity inversion occurs during the fully refreshed frame F3.

In the fully refreshed frame F1, the polarity of the data voltages VD applied to the pixels PX is positive, the gamma voltage generator 22 uses a positive supply voltage GVDDP of +5V and a default gamma table to generate a set of gamma voltages VG21(S:−S). The source driver 20 then generates 6 pixels voltages Vpx using the set of gamma voltages VG21(S:−S), and sequentially drive a source line to update data voltages VD for the pixels PX on the gate lines GL(0) to GL(5) according to the 6 pixels voltages Vpx. The refreshed data of the gray level "255" corresponds to a data voltages VD of +5V. When +5V is applied to the source line, the capacitors in the pixels PX along the gate lines GL(0) to GL(5) charge to +4.9V due to the RC loading effect, resulting in a uniform luminance of 300 nits.

In the partial refreshed frame F2, the polarity of the data voltages VD applied to the pixels PX is positive, the gamma voltage generator 22 uses a positive supply voltage GVDDP of +4.9V and the default gamma table to generate a set of gamma voltages VG22(S:−S). The source driver 20 then generates 3 pixels voltages Vpx using the set of gamma voltages VG22(S:−S), and sequentially drive the source line to update data voltages VD for pixels PX on the gate lines GL(0) to GL(2) according to the 3 pixels voltages Vpx. The refreshed data of the gray level "255" corresponds to a data voltages VD of +4.9V. When +4.9V is applied to the source line, the capacitors in the pixels PX along the gate lines GL(0) to GL(2) remain at +4.9V, maintaining the luminance at 300 nits. The gate lines GL(3) to GL(5) remain deactivated in the partial refreshed frame F2, halting updates for the pixels PX on the gate lines GL(3) to GL(5). Subsequently, the capacitors in the pixels PX along the gate lines GL(3) to GL(5) continue to hold +4.9V, maintaining the luminance at 300 nits. As a result, the pixels PX on the gate lines GL(0) to GL(5) maintain a uniform luminance of 300 nits.

In the fully refreshed frame F3, the polarity of the data voltages VD applied to the pixels PX is negative, the gamma voltage generator 22 uses a negative supply voltage GVDDN of −5V and the default gamma table to generate a set of gamma voltages VG23(S:−S). The source driver 20 then generates 6 pixels voltages Vpx using the set of gamma voltages VG23(S:−S), and sequentially drive a source line to update data voltages VD for the pixels PX on the gate lines GL(0) to GL(5) according to the 6 pixels voltages Vpx. The refreshed data of the gray level "255" corresponds to a data voltages VD of −5V. When −5V is applied to the source line, the capacitors in the pixels PX along the gate lines GL(0) to GL(5) charge to −4.9V due to the RC loading effect, resulting in a uniform luminance of 300 nits.

In the partial refreshed frame F4, the polarity of the data voltages VD applied to the pixels PX is negative, the gamma voltage generator 22 uses the negative supply voltage GVDDN of −5V, and the default gamma table to generate a set of gamma voltages VG24(S:−S). The source driver 20 then generates 3 pixels voltages Vpx using the set of gamma voltages VG24(S:−S), and sequentially drive the source line to update data voltages VD for pixels PX on the gate lines GL(0) to GL(7) according to the 3 pixels voltages Vpx. The gate lines GL(3) to GL(5) remain deactivated in the partial refreshed frame F4, halting updates for the pixels PX on the gate lines GL(3) to GL(5). The refreshed data of the gray level "255" corresponds to a data voltages VD of −4.9V. When −4.9V is applied to the source line, the capacitors in the pixels PX along the gate lines GL(0) to GL(2) remain at −4.9V, maintaining the luminance at 300 nits. Subsequently, the capacitors in the pixels PX along the gate lines GL(3) to GL(5) continue to hold −4.9V, maintaining the luminance at 300 nits. As a result, the pixels PX on the gate lines GL(0) to GL(5) maintain a uniform luminance of 300 nits.

Accordingly, the embodiment in table 2 delivers consistent luminance of 300 nits across the frames F1 to F4.

In some embodiments, the gamma voltage generator 22 may update the set of gamma voltages VG(S:−S) by selecting a suitable gamma table. The gamma voltage generator may determine a gamma table according to the polarity parameter and the frame update type, and update the set of gamma voltages according to the gamma table. Referring to Table 1, in the frame F1, the polarity parameter indicates the positive polarity and the frame update type is fully refreshed. Therefore, the gamma voltage generator 22 may generate the set of gamma voltages according to the gamma table Gamma-A. In the frame F2, the polarity parameter indicates the positive polarity and the frame update type is partially refreshed. Therefore, the gamma voltage generator 22 may generate the set of gamma voltages according to the gamma table Gamma-B different from the gamma table Gamma-A. In the frame F3, the polarity parameter indicates the negative polarity and the frame update type is fully refreshed. Therefore, the gamma voltage generator 22 may generate the set of gamma voltages according to the gamma table Gamma-C. In the frame F4, the polarity parameter indicates the negative polarity and the frame update type is partially refreshed. Therefore, the gamma voltage generator 22 may generate the set of gamma voltages according to the gamma table Gamma-D different from the gamma table Gamma-C. The selection of the supply voltages and gamma tables Gamma-A, Gamma-B, Gamma-C and Gamma-D may depend on the electrical characteristics of the pixel array 100 such as RC loading and current leakage. In some embodiments, different gamma tables may be used for the positive and negative polarities, as well as for the fully and partially refreshed frames. A numeric example is shown in Table 3. In an example, each gamma voltage in the gamma table Gamma-C may be equal to the corresponding gamma voltage in the gamma table Gamma-A minus 100 mV. Further, each gamma voltage in the gamma table Gamma-B may be equal to the corresponding gamma voltage in the gamma table Gamma-A minus 50 mV, and each gamma voltage in the gamma table Gamma-D may be equal to the corresponding gamma voltage in the gamma table Gamma-C minus 50 mV, Table 3 illustrates a configuration of the display device 1 according to another embodiment of the invention. Table 3 adopts the gamma table selection to update the set of gamma voltages VG(S:−S) frame by frame. The refreshed data may have a gray level "255", and the unrefreshed data may have a gray level "0". The polarity inversion occurs during a fully refreshed frame. Each cell contains the polarity parameter, the voltage in the capacitor of a pixel PX, and the luminance of the pixel PX, where the "+" and "−" symbols represent the positive polarity and negative polarity, respectively,

TABLE 3

| | F1 (FR) | F2 (PR) | F3 (FR) | F4 (PR) |
|---|---|---|---|---|
| Gamma | Gamma-A | Gamma-B | Gamma-C | Gamma-D |
| GL(0) | +/ +4.9 V/ 300 nits | +/ +4.9 V/ 300 nits | −/ −4.9 V/ 300 nits | −/ −4.9 V/ 300 nits |
| GL(1) | +/ +4.9 V/ 300 nits | +/ +4.9 V/ 300 nits | −/ −4.9 V/ 300 nits | −/ −4.9 V/ 300 nits |
| GL(2) | +/ +4.9 V/ 300 nits | +/ +4.9 V/ 300 nits | −/ −4.9 V/ 300 nits | −/ −4.9 V/ 300 nits |
| GL(3) | +/ +4.9 V/ 300 nits | +/ +4.9 V/ 300 nits | −/ −4.9 V/ 300 nits | −/ −4.9 V/ 300 nits |
| GL(4) | +/ +4.9 V/ 300 nits | +/ +4.9 V/ 300 nits | −/ −4.9 V/ 300 nits | −/ −4.9 V/ 300 nits |
| GL(5) | + +4.9 V/ 300 nits | +/ +4.9 V/ 300 nits | −/ −4.9 V/ 300 nits | −/ −4.9 V/ 300 nits |

Table 3 is similar to Table 2, but instead of modifying supply voltages, different gamma tables are selected to update the set of gamma voltages VG(S:−S). Explanation therefor may be similar to Table 2, and will not be repeated here for brevity. Accordingly, the embodiment in table 3 delivers consistent luminance of 300 nits across the frames F1 to F4.

In some embodiments, the set of gamma voltages VG(S:−S) may be updated on the basis of gate lines. Table 4 illustrates the configuration of the display device 1 according to another embodiment of the invention. Table 4 adopts the supply voltage modification to update the set of gamma voltages VG(S:−S) every 3 gate lines. The refreshed data may have a gray level "255", and the unrefreshed data may have a gray level "0". Each cell contains the polarity parameter, the voltage in the capacitor of a pixel PX, and the luminance of the pixel PX, where the "+" and "−" symbols represent the positive polarity and negative polarity, respectively,

TABLE 4

| | GVDDP/ GVDDN | F1 (FR) | F2 (PR) | F3 (FR) | F4 (PR) |
|---|---|---|---|---|---|
| GL(0) | ±5 V | +/ +4.9 V/ 300 nits | +/ +4.99 V/ 310 nits | −/ −4.9 V/ 300 nits | −/ −4.99 V/ 310 nits |
| GL(1) | ±5 V | +/ +4.9 V/ 300 nits | +/ +4.99 V/ 310 nits | −/ −4.9 V/ 300 nits | −/ −4.99 V/ 310 nits |
| GL(2) | ±5 V | +/ +4.9 V/ 300 nits | +/ +4.99 V/ 310 nits | −/ −4.9 V/ 300 nits | −/ −4.99 V/ 310 nits |
| GL(3) | ±5.1 V | +/ +4.99 V/ 310 nits | +/ +4.9 V/ 300 nits | −/ −4.99 V/ 310 nits | −/ −4.9 V/ 300 nits |
| GL(4) | ±5.1 V | +/ +4.99 V/ 310 nits | +/ +4.9 V/ 300 nits | −/ −4.99 V/ 310 nits | −/ −4.9 V/ 300 nits |
| GL(5) | ±5.1 V | +/ +4.99 V/ 310 nits | +/ +4.9 V/ 300 nits | −/ −4.99 V/ 310 nits | −/ −4.9 V/ 300 nits |

The pixel array 100 includes gate lines GL(0) to GL(5), where the gate lines GL(0) to GL(2) are located in the high refreshed rate area, and the gate lines GL(3) to GL(5) are located in the low refreshed rate area. The pixel array 100 sequentially receive a fully refreshed frame F1, partially refreshed frame F2, fully refreshed frame F3, and partially refreshed frame F4. The polarity inversion occurs during the fully refreshed frame F3.

During the gate lines GL(0) to GL(2) in the fully refreshed frame F1, the polarity of the data voltages VD applied to the pixels PX is positive, the gamma voltage generator 22 uses a positive supply voltage GVDDP of +5V and a default gamma table to generate a set of gamma voltages VG41(S:−S). The source driver 20 then generates 3 pixels voltages Vpx using the set of gamma voltages VG41(S:−S), and sequentially drive a source line to update data voltages VD for the pixels PX on the gate lines GL(0) to GL(2) according to the 3 pixels voltages Vpx. The refreshed data of the gray level "255" corresponds to a data voltages VD of +5V. When +5V is applied to the source line, the capacitors in the pixels PX along the gate lines GL(0) to GL(2) charge to +4.9V due to the RC loading effect, resulting in a luminance of 300 nits. During the gate lines GL(3) to GL(5) in the fully refreshed frame F1, the polarity of the data voltages VD applied to the pixels PX is positive, the gamma voltage generator 22 uses a positive supply voltage GVDDP of +5.1V and a default gamma table to generate a set of gamma voltages VG42(S:−S). The source driver 20 then generates 3 pixels voltages Vpx using the set of gamma voltages VG42(S:−S), and sequentially drive a source line to update data voltages VD for the pixels PX on the gate lines GL(3) to GL(5) according to the 3 pixels voltages Vpx. The refreshed data of the gray level "255" corresponds to a data voltages VD of +5.1V. When +5.1V is applied to the source line, the capacitors in the pixels PX along the gate lines GL(0) to GL(2) charge to +4.99V due to the RC loading effect, resulting in a luminance of 310 nits. Subsequently, the pixels PX on the gate lines GL(0) to GL(5) produce a substantially uniform luminance ranging between 300-310 nits.

During the gate lines GL(0) to GL(2) in the partial refreshed frame F2, the polarity of the data voltages VD applied to the pixels PX is positive, the gamma voltage generator 22 uses a positive supply voltage GVDDP of +5V and the default gamma table to generate a set of gamma voltages VG43(S:−S). The source driver 20 then generates 3 pixels voltages Vpx using the set of gamma voltages VG43 (S:−S), and sequentially drive the source line to update data voltages VD for pixels PX on the gate lines GL(0) to GL(2) according to the 3 pixels voltages Vpx. The refreshed data of the gray level "255" corresponds to a data voltages VD of +5V. When +5V is applied to the source line, the capacitors in the pixels PX along the gate lines GL(0) to GL(2) further charge to +4.99V, resulting in the luminance at 310 nits. The gate lines GL(3) to GL(5) remain deactivated in the partial refreshed frame F2, halting updates for the pixels PX on the gate lines GL(3) to GL(5). Subsequently, the voltages in the capacitors of the pixels PX along the gate lines GL(3) to GL(5) drop to +4.9V owing to current leakage, resulting in the luminance at 300 nits. Subsequently, the pixels PX on the gate lines GL(0) to GL(5) produce a substantially uniform luminance ranging between 300-310 nits.

During the gate lines GL(0) to GL(2) in the fully refreshed frame F3, the polarity of the data voltages VD applied to the pixels PX is negative, the gamma voltage generator 22 uses a negative supply voltage GVDDN of −5V and the default gamma table to generate a set of gamma voltages VG44(S:−S). The source driver 20 then generates 3 pixels voltages Vpx using the set of gamma voltages VG44(S:−S), and sequentially drive a source line to update data voltages VD for the pixels PX on the gate lines GL(0) to GL(2) according to the 3 pixels voltages Vpx. The refreshed data of the gray level "255" corresponds to a data voltages VD of −5V. When −5V is applied to the source line, the capacitors in the pixels PX along the gate lines GL(0) to GL(2) charge to −4.9V due to the RC loading effect, resulting in a luminance of 300 nits. During the gate lines GL(3) to GL(5) in the fully refreshed frame F3, the polarity of the data voltages VD applied to the pixels PX is negative, the gamma voltage generator 22 uses a negative supply voltage GVDDN of −5.1V and the default gamma table to generate a set of gamma voltages VG45(S:−S). The source driver 20 then generates 3 pixels voltages Vpx using the set of gamma voltages VG45(S:−S), and sequentially drive a source line to update data voltages VD for the pixels PX on the gate lines GL(3) to GL(5) according to the 3 pixels voltages Vpx. The refreshed data of the gray level "255" corresponds to a data voltages VD of −5.1V. When −5.1V is applied to the source line, the capacitors in the pixels PX along the gate lines GL(3) to GL(5) charge to −4.99V due to the RC loading effect, resulting in a luminance of 300 nits. Subsequently, the pixels PX on the gate lines GL(0) to GL(5) produce a substantially uniform luminance ranging between 300-310 nits.

During the gate lines GL(0) to GL(2) in the partial refreshed frame F4, the polarity of the data voltages VD applied to the pixels PX is negative, the gamma voltage generator 22 uses a negative supply voltage GVDDP of −5.1V and the default gamma table to generate a set of gamma voltages VG4546(S:−S). The source driver 20 then generates 3 pixels voltages Vpx using the set of gamma voltages VG4546(S:−S), and sequentially drive the source line to update data voltages VD for pixels PX on the gate lines GL(0) to GL(2) according to the 3 pixels voltages Vpx. The refreshed data of the gray level "255" corresponds to a data voltages VD of −5.1V. When −5.1 is applied to the source line, the capacitors in the pixels PX along the gate lines GL(0) to GL(2) further charge to −4.99V, resulting in the luminance at 310 nits. The gate lines GL(3) to GL(5) remain deactivated in the partial refreshed frame F4, halting updates for the pixels PX on the gate lines GL(3) to GL(5). Subsequently, the voltages in the capacitors of the pixels PX along the gate lines GL(3) to GL(5) drop to −4.9V owing to current leakage, resulting in the luminance at 300 nits. Subsequently, the pixels PX on the gate lines GL(0) to GL(5) produce a substantially uniform luminance ranging between 300-310 nits.

Accordingly, the embodiment in table 4 delivers consistent luminance of 300-310 nits across the frames F1 to F4.

In some embodiments, the set of gamma voltages may be updated before activating a gate line to the second area, as illustrated in Table 5. In other embodiments, the set of gamma voltages may be updated after activating a gate line to the second area, as illustrated in Table 6. Tables 5 and 6 illustrates the configuration of the display device 1 according to other embodiments of the invention. Tables 5 and 6 adopt the supply voltage modification to update the set of gamma voltages VG(S:−S) on the basis of gate lines. The refreshed data may have a gray level "255", and the unrefreshed data may have a gray level "0". Each cell contains the polarity parameter, the voltage in the capacitor of a pixel PX, and the luminance of the pixel PX, where the "+" and "−" symbols represent the positive polarity and negative polarity, respectively,

TABLE 5

| | GVDDP/ GVDDN | F1 (FR) | F2 (PR) | F3 (FR) | F4 (PR) |
|---|---|---|---|---|---|
| GL(0) | ±5 V | +/ +4.9 V/ 300 nits | +/ +4.99 V/ 310 nits | −/ −4.9 V/ 300 nits | −/ −4.99 V/ 310 nits |
| GL(1) | ±5 V | +/ +4.9 V/ 300 nits | +/ +4.99 V/ 310 nits | −/ −4.9 V/ 300 nits | −/ −4.99 V/ 310 nits |
| GL(2) | ±5 V/±5.1 V | +/ +4.9 V/ 300 nits | +/ +4.99 V/ 310 nits | −/ −4.9 V/ 300 nits | −/ −4.99 V/ 310 nits |
| GL(3) | ±5.1 V | +/ +4.99 V/ 310 nits | +/ +4.9 V/ 300 nits | −/ −4.99 V/ 310 nits | −/ −4.9 V/ 300 nits |
| GL(4) | ±5.1 V | +/ +4.99 V/ 310 nits | +/ +4.9 V/ 300 nits | −/ −4.99 V/ 310 nits | −/ −4.9 V/ 300 nits |
| GL(5) | ±5.1 V | +/ +4.99 V/ 310 nits | +/ +4.9 V/ 300 nits | −/ −4.99 V/ 310 nits | −/ −4.9 V/ 300 nits |

Table 5 is similar to Table 4, but the supply voltages are switched at the gate line GL(2) instead of the gate line GL(3), allowing time for the voltage transitioning from +5V to +5.1V, or from −5V to −5.1V, preparing the supply voltages ready for updating the set of gamma voltages VG(S:−S) for the next line, enabling a smooth transition between 2 sets of gamma voltages VG(S:−S). Explanation for Table 5 may be similar to Table 4, and will not be repeated here for brevity. Accordingly, the embodiment in table 5 delivers consistent luminance of 300-310 nits across the frames F1 to F4.

In some embodiments, the polarity parameter may be inverted in a partially refreshed frame, where the first area is refreshed and the second area is unrefreshed. Table 6 illustrates the configuration of the display device 1 according to another embodiment of the invention. The set of gamma voltages VG(S:−S) are updated per frame. The "+" and "−" symbols represent the positive polarity and negative polarity, respectively.

TABLE 6

| | F1 (FR) | F2 (PR) | F3 (FR) | F4 (PR) |
|---|---|---|---|---|
| GVDDP | GVDDP-A | GVDDP-B | GVDDP-A | GVDDP-B |
| GVDDN | GVDDN-A | GVDDN-B | GVDDN-A | GVDDN-B |
| Gamma | Gamma-A | Gamma-B | Gamma-C | Gamma-D |
| GL(0) | + | − | − | + |
| GL(1) | + | − | − | + |
| GL(2) | + | − | − | + |
| GL(3) | + | − | − | + |
| GL(4) | + | − | − | + |
| GL(5) | + | − | − | + |
| GL(6) | + | − | − | + |
| GL(7) | + | − | − | + |
| GL(8) | + | + | − | − |
| GL(9) | + | + | − | − |
| GL(10) | + | + | − | − |
| GL(11) | + | + | − | − |
| GL(12) | + | + | − | − |
| GL(13) | + | + | − | − |
| GL(14) | + | + | − | − |
| GL(15) | + | + | − | − |
| GL(16) | + | + | − | − |
| GL(17) | + | + | − | − |
| GL(18) | + | + | − | − |
| GL(19) | + | + | − | − |

The pixel array 100 includes gate lines GL(0) to GL(19), where the gate lines GL(0) to GL(7) are located in the high refreshed rate area, and the gate lines GL(8) to GL(19) are located in the low refreshed rate area. The pixel array 100 sequentially receive a fully refreshed frame F1, partially refreshed frame F2, fully refreshed frame F3, and partially refreshed frame F4. The polarity inversion occurs during the partially refreshed frames F2 and F4.

In the fully refreshed frame F1, the polarity of the data voltages VD applied to the pixels PX is positive, the gamma voltage generator 22 uses a supply voltage GVDDP-A, and/or the gamma table Gamma-A to generate a set of gamma voltages VG71(S:−S). The source driver 20 then generates 20 pixels voltages Vpx using the set of gamma voltages VG71(S:−S), and sequentially drive a source line to update data voltages VD for the pixels PX on the gate lines GL(0) to GL(19) according to the 20 pixels voltages Vpx.

In the partial refreshed frame F2, the polarity of the data voltages VD applied to the pixels PX is negative, the gamma voltage generator 22 uses a supply voltage GVDDN-B, and/or the gamma table Gamma-B to generate a set of gamma voltages VG72(S:−S). The source driver 20 then generates 8 pixels voltages Vpx using the set of gamma voltages VG72(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F2, halting updates for the pixels PX on the gate lines GL(8) to GL(19).

In the fully refreshed frame F3, the polarity of the data voltages VD applied to the pixels PX is negative, the gamma voltage generator 22 uses a supply voltage GVDDN-A, and/or the gamma table Gamma-C to generate a set of gamma voltages VG73(S:−S). The source driver 20 then generates 20 pixels voltages Vpx using the set of gamma voltages VG73(S:−S), and sequentially drive a source line to update data voltages VD for the pixels PX on the gate lines GL(0) to GL(19) according to the 20 pixels voltages Vpx.

In the partial refreshed frame F4, the polarity of the data voltages VD applied to the pixels PX is positive, the gamma voltage generator 22 uses a supply voltage GVDDP-B, and/or the gamma table Gamma-D to generate a set of gamma voltages VG74(S:−S). The source driver 20 then generates 8 pixels voltages Vpx using the set of gamma voltages VG14(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F4, halting updates for the pixels PX on the gate lines GL(8) to GL(19).

Table 7 illustrates the configuration of the display device 1 according to another embodiment of the invention. The pixel array 100 may be updated by 1 fully refreshed frame followed by 2 partially refreshed frames. The set of gamma voltages VG(S:−S) are updated per frame. The "+" and "−" symbols represent the positive polarity and negative polarity, respectively.

TABLE 7

| | F1 (FR) | F2 (PR) | F3 (PR) | F4 (FR) | F5 (PR) | F6 (PR) |
|---|---|---|---|---|---|---|
| GVDDP | GVDDP-A | GVDDP-B | GVDDP-C | GVDDP-A | GVDDP-B | GVDDP-C |
| GVDDN | GVDDN-A | GVDDN-B | GVDDN-C | GVDDN-A | GVDDN-B | GVDDN-C |
| Gamma | Gamma-A | Gamma-B | Gamma-C | Gamma-A | Gamma-B | Gamma-C |
| GL(0) | + | − | + | − | + | − |
| GL(1) | + | − | + | − | + | − |
| GL(2) | + | − | + | − | + | − |
| GL(3) | + | − | + | − | + | − |
| GL(4) | + | − | + | − | + | − |
| GL(5) | + | − | + | − | + | − |
| GL(6) | + | − | + | − | + | − |
| GL(7) | + | − | + | − | + | − |
| GL(8) | + | + | + | − | − | − |
| GL(9) | + | + | + | − | − | − |
| GL(10) | + | + | + | − | − | − |
| GL(11) | + | + | + | − | − | − |
| GL(12) | + | + | + | − | − | − |
| GL(13) | + | + | + | − | − | − |
| GL(14) | + | + | + | − | − | − |
| GL(15) | + | + | + | − | − | − |
| GL(16) | + | + | + | − | − | − |
| GL(17) | + | + | + | − | − | − |
| GL(18) | + | + | + | − | − | − |
| GL(19) | + | + | + | − | − | − |

The pixel array 100 includes gate lines GL(0) to GL(19), where the gate lines GL(0) to GL(7) are located in the high refreshed rate area, and the gate lines GL(8) to GL(19) are located in the low refreshed rate area. The pixel array 100 sequentially receive a fully refreshed frame F1, partially refreshed frame F2, partially refreshed frame F3, fully refreshed frame F4, partially refreshed frame F5, and partially refreshed frame F6. The polarity inversion occurs during the fully refreshed frame F4.

In the fully refreshed frame F1, the polarity of the data voltages VD applied to the pixels PX is positive, the gamma voltage generator 22 uses a supply voltage GVDDP-A, and/or the gamma table Gamma-A to generate a set of gamma voltages VG81(S:−S). The supply voltage GVDDP-A may be 5V, and the gamma table Gamma-A may correspond to the curves 60*p* and 60*n*. The source driver 20 then generates 20 pixels voltages Vpx using the set of gamma voltages VG81(S:−S), and sequentially drive a source line to update data voltages VD for the pixels PX on the gate lines GL(0) to GL(19) according to the 20 pixels voltages Vpx.

In the partial refreshed frame F2, the polarity of the data voltages VD applied to the pixels PX is positive, the gamma voltage generator 22 uses a supply voltage GVDDP-B, and/or the gamma table Gamma-B to generate a set of gamma voltages VG82(S:−S). The supply voltage GVDDP-B may be 4.9V, and the gamma table Gamma-B may correspond to the curves 62*p* and 62*n*. The source driver 20 then generates 8 pixels voltages Vpx using the set of gamma voltages VG82(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F2, halting updates for the pixels PX on the gate lines GL(8) to GL(19).

In the partial refreshed frame F3, the polarity of the data voltages VD applied to the pixels PX is positive, the gamma voltage generator 22 uses a supply voltage GVDDP-C, and/or the gamma table Gamma-C to generate a set of gamma voltages VG83(S:−S). The supply voltage GVDDP-C may be 4.8V, and the gamma table Gamma-C may correspond to another set of gamma curves. The source driver 20 then generates 8 pixels voltages Vpx using the set of gamma voltages VG83(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F3, halting updates for the pixels PX on the gate lines GL(8) to GL(19).

In the fully refreshed frame F4, the polarity of the data voltages VD applied to the pixels PX is negative, the gamma voltage generator 22 uses a supply voltage GVDDN-A, and/or the gamma table Gamma-A to generate a set of gamma voltages VG84(S:−S). The supply voltage GVDDN-A may be −5V, and the gamma table Gamma-A may correspond to the curves 60*p* and 60*n*. The source driver 20 then generates 20 pixels voltages Vpx using the set of gamma voltages VG84(S:−S), and sequentially drive a source line to update data voltages VD for the pixels PX on the gate lines GL(0) to GL(19) according to the 20 pixels voltages Vpx.

In the partial refreshed frame F5, the polarity of the data voltages VD applied to the pixels PX is negative, the gamma voltage generator 22 uses a supply voltage GVDDN-B, and/or the gamma table Gamma-B to generate a set of gamma voltages VG85(S:−S). The supply voltage GVDDN-B may be −4.9V, and the gamma table Gamma-B may correspond to the curves 62*p* and 62*n*. The source driver 20 then generates 8 pixels voltages Vpx using the set of gamma voltages VG85(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F5, halting updates for the pixels PX on the gate lines GL(8) to GL(19).

In the partial refreshed frame F6, the polarity of the data voltages VD applied to the pixels PX is negative, the gamma voltage generator 22 uses a supply voltage GVDDN-B, and/or the gamma table Gamma-C to generate a set of gamma voltages VG86(S:−S). The supply voltage GVDDN-C may be −4.8V, and the gamma table Gamma-C may correspond to the set of gamma curves. The source driver 20 then generates 8 pixels voltages Vpx using the set of gamma voltages VG86(S:−S), and sequentially drive the source line to update data voltages VD for pixels PX on the gate lines GL(0) to GL(7) according to the 8 pixels voltages Vpx. The gate lines GL(8) to GL(19) remain deactivated in the partial refreshed frame F6, halting updates for the pixels PX on the gate lines GL(8) to GL(19).

Table 8 illustrates the configuration of the display device 1 according to another embodiment of the invention. The pixel array 100 may be updated by 1 fully refreshed frame followed by 2 partially refreshed frames. The set of gamma voltages VG(S:−S) are updated per frame. The "+" and "−" symbols represent the positive polarity and negative polarity, respectively.

TABLE 8

| | F1 (FR) | F2 (PR) | F3 (PR) | F4 (FR) | F5 (PR) | F6 (PR) |
|---|---|---|---|---|---|---|
| GVDDP/ GVDDN | +5 V | −4.8 V | +4.7 V | −5 V | +4.8 V | −4.7 V |
| GL(0) | +/+4.9 V/300 nits | −/−4.8 V/290 nits | +/+4.7 V/280 nits | −/−4.9 V/300 nits | +/+4.8 V/290 nits | −/−4.7 V/280 nits |
| GL(1) | +/+4.9 V/300 nits | −/−4.8 V/290 nits | +/+4.7 V/280 nits | −/−4.9 V/300 nits | +/+4.8 V/290 nits | −/−4.7 V/280 nits |
| GL(2) | +/+4.9 V/300 nits | −/−4.8 V/290 nits | +/+4.7 V/280 nits | −/−4.9 V/300 nits | +/+4.8 V/290 nits | −/−4.7 V/280 nits |
| GL(3) | +/+4.9 V/300 nits | +/+4.8 V/290 nits | +/+4.7 V/280 nits | −/−4.9 V/300 nits | −/−4.8 V/290 nits | −/−4.7 V/280 nits |
| GL(4) | +/+4.9 V/300 nits | +/+4.8 V/290 nits | +/+4.7 V/280 nits | −/−4.9 V/300 nits | −/−4.8 V/290 nits | −/−4.7 V/280 nits |
| GL(5) | +/+4.9 V/300 nits | +/+4.8 V/290 nits | +/+4.7 V/280 nits | −/−4.9 V/300 nits | −/−4.8 V/290 nits | −/−4.7 V/280 nits |

The pixel array 100 includes gate lines GL(0) to GL(19), where the gate lines GL(0) to GL(2) are located in the high refreshed rate area, and the gate lines GL(3) to GL(5) are located in the low refreshed rate area. The pixel array 100 sequentially receive a fully refreshed frame F1, partially refreshed frame F2, partially refreshed frame F3, fully refreshed frame F4, partially refreshed frame F5, and partially refreshed frame F6. The polarity inversion occurs during the partially refreshed frames F2 and F3, the fully refreshed frame F4, the partially refreshed frames F5 and F6.

In the fully refreshed frame F1, the polarity of the data voltages VD applied to the pixels PX is positive, the gamma voltage generator 22 uses a supply voltage GVDDP of +5V and a default gamma table to generate a set of gamma voltages VG91(S:−S). The source driver 20 then generates 6 pixels voltages Vpx using the set of gamma voltages VG91 (S:−S), and sequentially drive a source line to update data voltages VD for the pixels PX on the gate lines GL(0) to GL(19) according to the 6 pixels voltages Vpx. The refreshed data of the gray level "255" corresponds to a data voltages VD of +5V. When +5V is applied to the source line, the capacitors in the pixels PX along the gate lines GL(0) to GL(5) charge to +4.9V due to the RC loading effect, resulting in a luminance of 300 nits.

In the partial refreshed frame F2, the polarity of the data voltages VD applied to the pixels PX is positive, the gamma voltage generator 22 uses a supply voltage GVDDN of −4.8V and the default gamma table to generate a set of gamma voltages VG92(S:−S). The source driver 20 then generates 3 pixels voltages Vpx using the set of gamma voltages VG92(S:−S), and sequentially drive the source line to update data voltages VD for pixels PX on the gate lines GL(0) to GL(2) according to the 3 pixels voltages Vpx. The gate lines GL(3) to GL(5) remain deactivated in the partial refreshed frame F2, halting updates for the pixels PX on the gate lines GL(3) to GL(5). The refreshed data of the gray level "255" corresponds to a data voltages VD of −4.8V. When −4.8V is applied to the source line, the capacitors in the pixels PX along the gate lines GL(0) to GL(2) charge to −4.8V, generating a luminance of 290 nits. The gate lines GL(3) to GL(5) remain deactivated in the partial refreshed frame F2, halting updates for the pixels PX on the gate lines GL(3) to GL(5). Subsequently, the capacitors in the pixels PX along the gate lines GL(3) to GL(5) decay to +4.8V, resulting in a luminance of 290 nits. As a result, the pixels PX on the gate lines GL(0) to GL(5) maintain a uniform luminance of 290 nits.

In the partial refreshed frame F3, the polarity of the data voltages VD applied to the pixels PX is positive, the gamma voltage generator 22 uses a supply voltage GVDDP of +4.7V and the default gamma table to generate a set of gamma voltages VG93(S:−S). The source driver 20 then generates 3 pixels voltages Vpx using the set of gamma voltages VG93(S:−S), and sequentially drive the source line to update data voltages VD for pixels PX on the gate lines GL(0) to GL(2) according to the 3 pixels voltages Vpx. The gate lines GL(3) to GL(5) remain deactivated in the partial refreshed frame F3, halting updates for the pixels PX on the gate lines GL(3) to GL(5). The refreshed data of the gray level "255" corresponds to a data voltages VD of +4.7V. When +4.7V is applied to the source line, the capacitors in the pixels PX along the gate lines GL(0) to GL(2) charge to +4.7V, generating a luminance of 280 nits. The gate lines GL(3) to GL(5) remain deactivated in the partial refreshed frame F2, halting updates for the pixels PX on the gate lines GL(3) to GL(5). Subsequently, the capacitors in the pixels PX along the gate lines GL(3) to GL(5) decay to +4.7V, resulting in a luminance of 280 nits. As a result, the pixels PX on the gate lines GL(0) to GL(5) maintain a uniform luminance of 280 nits.

In the fully refreshed frame F4, the polarity of the data voltages VD applied to the pixels PX is negative, the gamma voltage generator 22 uses a supply voltage GVDDN of −5V and the default gamma table to generate a set of gamma voltages VG94(S:−S). The source driver 20 then generates 6 pixels voltages Vpx using the set of gamma voltages VG94 (S:−S), and sequentially drive a source line to update data voltages VD for the pixels PX on the gate lines GL(0) to GL(19) according to the 6 pixels voltages Vpx. The refreshed data of the gray level "255" corresponds to a data voltages VD of −5V. When −5V is applied to the source line, the capacitors in the pixels PX along the gate lines GL(0) to GL(5) charge to −4.9V due to the RC loading effect, resulting in a luminance of 300 nits.

In the partial refreshed frame F5, the polarity of the data voltages VD applied to the pixels PX is negative, the gamma voltage generator 22 uses a supply voltage GVDDP of +4.8V and the default gamma table to generate a set of gamma voltages VG95(S:−S). The source driver 20 then generates 3 pixels voltages Vpx using the set of gamma voltages VG95(S:−S), and sequentially drive the source line to update data voltages VD for pixels PX on the gate lines GL(0) to GL(2) according to the 3 pixels voltages Vpx. The gate lines GL(3) to GL(5) remain deactivated in the partial refreshed frame F5, halting updates for the pixels PX on the gate lines GL(3) to GL(5). The refreshed data of the gray level "255" corresponds to a data voltages VD of +4.8V. When +4.8V is applied to the source line, the capacitors in the pixels PX along the gate lines GL(0) to GL(2) charge to +4.8V, generating a luminance of 290 nits. The gate lines GL(3) to GL(5) remain deactivated in the partial refreshed frame F2, halting updates for the pixels PX on the gate lines GL(3) to GL(5). Subsequently, the capacitors in the pixels PX along the gate lines GL(3) to GL(5) decay to +4.8V, resulting in a luminance of 290 nits. As a result, the pixels PX on the gate lines GL(0) to GL(5) maintain a uniform luminance of 290 nits.

In the partial refreshed frame F6, the polarity of the data voltages VD applied to the pixels PX is negative, the gamma voltage generator 22 uses a supply voltage GVDDN of −4.7V and the default gamma table to generate a set of gamma voltages VG96(S:−S). The source driver 20 then generates 3 pixels voltages Vpx using the set of gamma voltages VG96(S:−S), and sequentially drive the source line to update data voltages VD for pixels PX on the gate lines GL(0) to GL(2) according to the 3 pixels voltages Vpx. The gate lines GL(3) to GL(5) remain deactivated in the partial refreshed frame F6, halting updates for the pixels PX on the gate lines GL(3) to GL(5). The refreshed data of the gray level "255" corresponds to a data voltages VD of −4.7V. When −4.7V is applied to the source line, the capacitors in the pixels PX along the gate lines GL(0) to GL(2) charge to −4.7V, generating a luminance of 280 nits. The gate lines GL(3) to GL(5) remain deactivated in the partial refreshed frame F2, halting updates for the pixels PX on the gate lines GL(3) to GL(5). Subsequently, the capacitors in the pixels PX along the gate lines GL(3) to GL(5) decay to −4.7V, resulting in a luminance of 280 nits. As a result, the pixels PX on the gate lines GL(0) to GL(5) maintain a uniform luminance of 280 nits.

Accordingly, the embodiment in table 4 delivers consistent luminance ranging between 300 nits and 280 nits across the frames F1 to F6.

For an OLED display panel 10, the gamma voltage generator 22 may determine a frame update type according to the first refresh rate and the second refresh rate, and update the set of gamma voltages VG(S:−S) according to the frame update type. The methods of updating the set of gamma voltages VG(S:−S) may be similar to those for the LCD display panel 10 without consideration of the polarity parameter as illustrated in Table 9. In Table 9, the frames F1 and F3 are fully refreshed frames, and the set of gamma voltages VG(S:−S) may be generated based on the supply voltage GVDDP-A and/or the gamma table Gamma-A. The frames F2 and F4 are partially refreshed frames, and the set of gamma voltages VG(S:−S) may be generated based on the supply voltage GVDDP-B and/or the gamma table Gamma-B.

TABLE 9

| | F1 (FR) | F2 (PR) | F3 (FR) | F4 (PR) |
|---|---|---|---|---|
| GVDDP | GVDDP-A | GVDDP-B | GVDDP-A | GVDDP-B |
| Gamma | Gamma-A | Gamma-B | Gamma-A | Gamma-B |

Next, the source driver 20 may generate a pixel voltage Vpx according to pixel data Dpx and the set of gamma voltages VG(S:−S), reset the first area prior to driving the source line according to the pixel voltage Vpx, and drive a source line according to the pixel voltage Vpx. The frame update type may be either fully refreshed or partially refreshed.

In some embodiments, the gamma voltage generator 22 may update the set of gamma voltages VG(S:−S) by modifying the positive supply voltage GVDDP/negative supply voltage GVDDN. The driver circuit 12 may determine a frame update type according to the first refresh rate and the second refresh rate, and the gamma voltage generator 22 may determine a supply voltage according to the frame update type, and update the set of gamma voltages according to the supply voltage. In some embodiments, the gamma voltage generator 22 may update the set of gamma voltages VG(S:−S) by selecting a suitable gamma table. The driver circuit 12 may determining a frame update type according to the first refresh rate and the second refresh rate, and the gamma voltage generator 22 may generate a gamma table according to the frame update type, and update the set of gamma voltages according to the gamma table.

Although the embodiments of the invention demonstrate the operation of multi-area frame rate scheme for 2 refresh rates, those skilled in the field would recognize that the multi-area frame rate can be extended to more than 2 refresh rates using the similar principle.

The methods and driver circuits according to various embodiments of the invention harmonize the brightness levels between high refresh rate areas and low refresh rate areas by dynamically adjusting the gamma table or the supply voltages GVDDP/GVDDN based on frame types, area boundaries, polarity types and other associated parameters, thereby mitigating visual inconsistencies resulting from varying brightness at different areas.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of driving source lines of a display panel, the display panel comprising a first area and a second area, the method comprising:

updating a set of gamma voltages according to at least a first refresh rate of the first area and a second refresh rate of the second area;

generating a pixel voltage according to pixel data and the set of gamma voltages;

resetting the first area prior to driving a source line according to the pixel voltage; and driving the source line according to the pixel voltage.

2. The method of claim 1, wherein the updating of the set of gamma voltages according to at least the first refresh rate of the first area and the second refresh rate of the second area comprises:

determining a frame update type according to the first refresh rate and the second refresh rate; and updating the set of gamma voltages according to a polarity parameter and the frame update type.

3. The method of claim 2, wherein the updating of the set of gamma voltages according to the polarity parameter and the frame update type comprises:

determining a supply voltage according to the polarity parameter and the frame update type; and updating the set of gamma voltages according to the supply voltage.

4. The method of claim 2, wherein the updating of the set of gamma voltages according to the polarity parameter, and the frame update type comprises:

determining a gamma table according to the polarity parameter and the frame update type; and updating the set of gamma voltages according to the gamma table.

5. The method of claim 1, wherein the first refresh rate exceeds the second refresh rate.

6. The method of claim 1, wherein the set of gamma voltages is updated according to frames.

7. The method of claim 1, wherein the set of gamma voltages is updated on according to gate lines.

8. The method of claim 7, wherein the set of gamma voltages is updated before activating a gate line to the second area.

9. The method of claim 1, wherein the first area and the second area are defined by a clock signal.

10. The method of claim 1, wherein the updating of the set of gamma voltages according to at least the first refresh rate of the first area and the second refresh rate of the second area comprises:

determining a frame update type according to the first refresh rate and the second refresh rate;

determining a supply voltage according to the frame update type; and updating the set of gamma voltages according to the supply voltage.

11. The method of claim 1, wherein the updating of the set of gamma voltages according to at least the first refresh rate of the first area and the second refresh rate of the second area comprises:

determining a frame update type according to the first refresh rate and the second refresh rate;

generating a gamma table according to the frame update type; and updating the set of gamma voltages according to the gamma table.

12. A driver circuit of driving source lines of a display panel, the display panel comprising a first area and a second area, the driver circuit comprising:

a gamma voltage generator to update a set of gamma voltages according to at least a first refresh rate of the first area and a second refresh rate of the second area; and a source driver coupled to the gamma voltage generator to generate a pixel voltage according to pixel data and the set of gamma voltages, and drive a source line according to the pixel voltage;

wherein the set of gamma voltages is updated before activating a gate line to the second area.

13. The driver circuit of claim 12, wherein:

the driver circuit determines a frame update type according to the first refresh rate and the second refresh rate; and the gamma voltage generator updates the set of gamma voltages according to a polarity parameter and the frame update type.

14. The driver circuit of claim 13, wherein:

the gamma voltage generator determines a supply voltage according to the polarity parameter and the frame update type, and updates the set of gamma voltages according to the supply voltage.

15. The driver circuit of claim 13, wherein:

the gamma voltage generator determines a gamma table according to the polarity parameter and the frame update type, and updates the set of gamma voltages according to the gamma table.

16. The driver circuit of claim 12, wherein the first refresh rate exceeds the second refresh rate.

17. The driver circuit of claim 12, wherein the set of gamma voltages is updated according to frames.

18. The driver circuit of claim 12, wherein the set of gamma voltages is updated according to gate lines.

19. The driver circuit of claim 12, wherein the first area and the second area is defined by a clock signal.

20. The driver circuit of claim 12, wherein the driver circuit further resets the first area prior to driving the source line according to the pixel voltage.

21. The driver circuit of claim 20, wherein:

the driver circuit determines a frame update type according to the first refresh rate and the second refresh rate; and the gamma voltage generator determines a supply voltage according to the frame update type, and updates the set of gamma voltages according to the supply voltage.

22. The driver circuit of claim 20, wherein:

the driver circuit determines a frame update type according to the first refresh rate and the second refresh rate; and the gamma voltage generator determines a gamma table according to the frame update type, and updates the set of gamma voltages according to the gamma table.

* * * * *